(12) United States Patent
Kawakami

(10) Patent No.: US 12,071,562 B2
(45) Date of Patent: Aug. 27, 2024

(54) CYCLIC SILAZANE COMPOUND HAVING ALKOXYSILYL GROUP, METHOD FOR PRODUCING SAME, AND COMPOSITION, CURED PRODUCT AND COVERED SUBSTRATE CONTAINING SAME

(71) Applicant: Shin-Etsu Chemical Co., Ltd., Tokyo (JP)

(72) Inventor: Masato Kawakami, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/948,288

(22) Filed: Sep. 20, 2022

(65) Prior Publication Data

US 2023/0108908 A1   Apr. 6, 2023

(30) Foreign Application Priority Data

Sep. 29, 2021   (JP) .................. 2021-158811

(51) Int. Cl.
| | | |
|---|---|---|
| C07F 7/10 | (2006.01) | |
| C08G 77/54 | (2006.01) | |
| C09D 183/14 | (2006.01) | |
| C07F 7/08 | (2006.01) | |

(52) U.S. Cl.
CPC ........... C09D 183/14 (2013.01); C08G 77/54 (2013.01); C07F 7/0816 (2013.01)

(58) Field of Classification Search
CPC .................................................. C07F 7/0816
USPC ........................................................ 556/407
See application file for complete search history.

(56) References Cited

U.S. PATENT DOCUMENTS

| | | | | |
|---|---|---|---|---|
| 4,691,038 | A * | 9/1987 | Pohl ................. | C08L 83/04 556/407 |
| 4,804,771 | A * | 2/1989 | Pepe ................. | C07F 7/1804 556/407 |
| 6,531,620 | B2 * | 3/2003 | Brader .............. | C07F 7/188 556/412 |
| 8,450,512 | B1 * | 5/2013 | Piskoti ............. | C07F 7/0838 556/407 |
| 2005/0080284 | A1 * | 4/2005 | Kuimelis .......... | C07F 7/1804 556/407 |

FOREIGN PATENT DOCUMENTS

| | | |
|---|---|---|
| JP | 2001-354678 A | 12/2001 |
| JP | 2015-160811 A | 9/2015 |

* cited by examiner

*Primary Examiner* — Margaret G Moore
(74) *Attorney, Agent, or Firm* — Birch, Stewart, Kolasch & Birch, LLP

(57) ABSTRACT

A cyclic silazane compound having an alkoxysilyl group, represented by the following general formula (1):

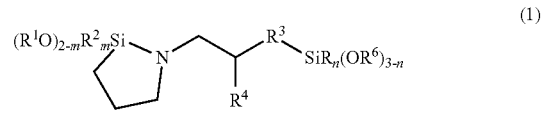

(1)

wherein $R^1$, $R^2$, $R^5$ and $R^6$ each independently represent an unsubstituted monovalent hydrocarbon group having 1 to 10 carbon atoms, $R^3$ represents a divalent hydrocarbon group having 4 to 20 carbon atoms, which may contain a sulfur atom, an ester bond or a urea bond, $R^4$ represents a hydrogen atom or an unsubstituted monovalent hydrocarbon group having 1 to 10 carbon atoms, m is 0 or 1, and n is 0, 1 or 2.

6 Claims, 10 Drawing Sheets

CYCLIC SILAZANE COMPOUND HAVING ALKOXYSILYL GROUP, METHOD FOR PRODUCING SAME, AND COMPOSITION, CURED PRODUCT AND COVERED SUBSTRATE CONTAINING SAME

CROSS-REFERENCE TO RELATED APPLICATION

This non-provisional application claims priority under 35 U.S.C. § 119(a) on Patent Application No. 2021-158811 filed in Japan on Sep. 29, 2021, the entire contents of which are hereby incorporated by reference.

TECHNICAL FIELD

The present invention relates to a cyclic silazane compound having an alkoxysilyl group, a method for producing the cyclic silazane compound, and a composition, a cured product and a covered substrate containing the cyclic silazane compound.

BACKGROUND ART

A nitrogen-containing organoxysilane compound is useful as a silane coupling agent, a surface treatment agent, a resin additive, a coating material additive, or the like.

As such nitrogen-containing organoxysilane compounds, organoxysilane compounds having a primary amino group, such as aminopropyltrimethoxysilane, organoxysilane compounds having a secondary amino group, such as N-phenylaminopropyltrimethoxysilane, organoxysilane compounds having a tertiary amino group, such as dimethylaminopropyltrimethoxysilane, and the like are known. Among them, organoxysilane compounds having a secondary amino group, in particular, can be turned into a cyclic silazane compound when intramolecularly cyclized at an amino group and an alkoxysilane site in the molecule.

The cyclic silazane compound does not react with a functional group reactive with an amino group, for example an epoxy group or an isocyanate group, because active hydrogen on nitrogen is protected with silicon in the molecule. Thus, a one-component composition can be prepared by mixing the cyclic silazane compound with a reactive resin or the like. When the cyclic silazane compound in this composition is exposed to air, moisture in the air reacts with a cyclic silazane site to form an organoxysilane compound having a secondary amino group or a hydrolyzate thereof, so the above-described function is exhibited.

In addition, the cyclic silazane compound has high reactivity, and therefore can rapidly react with moisture in the air or alcohol to form a film. In particular, cyclic silazane compounds such as 2,2-dimethoxy-N-(trimethoxysilylpropyl)-1-aza-2-silacyclopentane (Patent Document 1) and 2,2-dimethoxy-N-[(trimethoxysilyl)ethyldimethylsiloxy-dimethylsilyl(methyl)propyl]-1-aza-2-silacyclopentane, (Patent Document 2) have a site capable of reacting with moisture in the air, in addition to a cyclic silazane skeleton, and therefore can rapidly form a film.

CITATION LIST

Patent Document 1: JP-A 2015-160811
Patent Document 2: JP-A 2001-354678

SUMMARY OF THE INVENTION 2,2-dimethoxy-N-(trimethoxysilylpropyl)-1-aza-2-silacyclopentane described in Patent Document 1 has a high ratio of methoxy groups to the molecular weight because there are five methoxy groups that are capable of condensation. Thus, with progression of hydrolytic condensation, theoretically one oxygen atom is introduced along with elimination of two methoxy groups to form a film, so that the molecular weight decreases, resulting in large shrinkage on curing. This causes a problem that the film is cracked after curing and the film peels from the substrate.

On the other hand, in the 2,2-dimethoxy-N-[(trimethoxysilyl)ethyldimethylsiloxy-dimethylsilyl(methyl)propyl]-1-aza-2-silacyclopentane described in Patent Document 2, there are five methoxy groups that are capable of condensation as in the compound described in Patent Document 1, but the spacer between nitrogen and the alkoxysilyl group is long, so that the molecular weight increases, resulting in a reduced crosslinking density. Thus, the degree of shrinkage on curing in film formation with progression of hydrolytic condensation may become relatively small, leading to improvement of the above-described problem.

However, the compound described in Patent Document 2 contains a siloxane bond in a spacer between nitrogen and an alkoxysilyl group, and therefore has a problem that the compound has high surface migration, so that when applied to, for example, a substrate, the compound cannot adhere or has low adhesion to the substrate as sufficient interaction, bond formation or the like does not occur between amino groups and the substrate.

The present invention has been made in view of the above-described circumstances, and an object of the present invention is to provide a cyclic silazane compound which gives a cured product having crack resistance enabling suppression of cracking and peeling caused by shrinkage on curing, and adhesion, a method for producing the cyclic silazane compound, and a composition, a cured product and a covered substrate containing the cyclic silazane compound.

The present inventor has extensively conducted studies for solving the above-described problems, and resultantly found that a cyclic silazane compound having a predetermined alkoxysilyl group, which is free of a siloxane bond and has an extended spacer between nitrogen and the alkoxysilyl group, rapidly reacts with moisture in the air to form a film, and the film has crack resistance enabling suppression of cracking and peeling caused by shrinkage on curing, and adhesion, leading to completion of the present invention.

That is, the present invention provides:
1. A cyclic silazane compound having an alkoxysilyl group, represented by the following general formula (I):

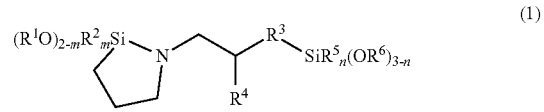

(1)

wherein $R^1$, $R^2$, $R^5$ and $R^6$ each independently represent an unsubstituted monovalent hydrocarbon group having 1 to 10 carbon atoms, $R^3$ represents a divalent hydrocarbon group having 4 to 20 carbon atoms, which may contain a sulfur atom, an ester bond or a urea bond, $R^4$ represents a hydrogen atom or an unsubstituted monovalent hydrocarbon group having 1 to 10 carbon atoms, m is 0 or 1, and n is 0, 1 or 2;

2. A method for producing the cyclic silazane compound having an alkoxysilyl group according to 1, the method including intramolecularly dealcoholizing and cyclizing a bis(alkoxysilylalkyl)aminosilane compound of the following general formula (2):

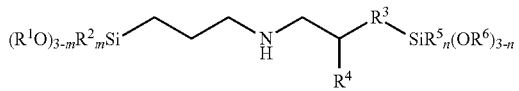

(2)

wherein $R^1$ to $R^6$, m and n represent the same meaning as described above;

3. A method for producing the cyclic silazane compound having are alkoxysilyl group according to 1, the method including reacting a cyclic silazane compound of the following general formula (3):

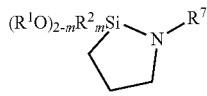

(3)

wherein $R^1$, $R^2$ and m represent the same meaning as described above, and $R^7$ represents a monovalent hydrocarbon group having 1 to 18 carbon atoms and having an unsaturated bond or an amino group at the terminal thereof, with an alkoxysilane compound of the following general formula (4):

A-SiR$^5_n$(OR$^6$)$_{3-n}$ (4)

wherein $R^5$, $R^6$ and n represent the same meaning as described above, and A represents a hydrogen atom, a mercaptoalkyl group having 1 to 8 carbon atoms, or an isocyanatoalkyl group having 1 to 8 carbon atoms;

4. A curable composition including the cyclic silazane compound according to 1;
5. A cured product of the curable composition according to 4; and
6. A covered substrate including a substrate, and a film formed on the substrate, the film being formed from the curable composition according to 4.

Advantageous Effects of the Invention

The cyclic silazane compound having an alkoxysilyl group according to the present invention can rapidly react with moisture in the air to form a film, and the resulting film has crack resistance (suppressing cracking and peeling of the film) and adhesion.

DESCRIPTION OF THE PREFERRED EMBODIMENT

Figure 1:
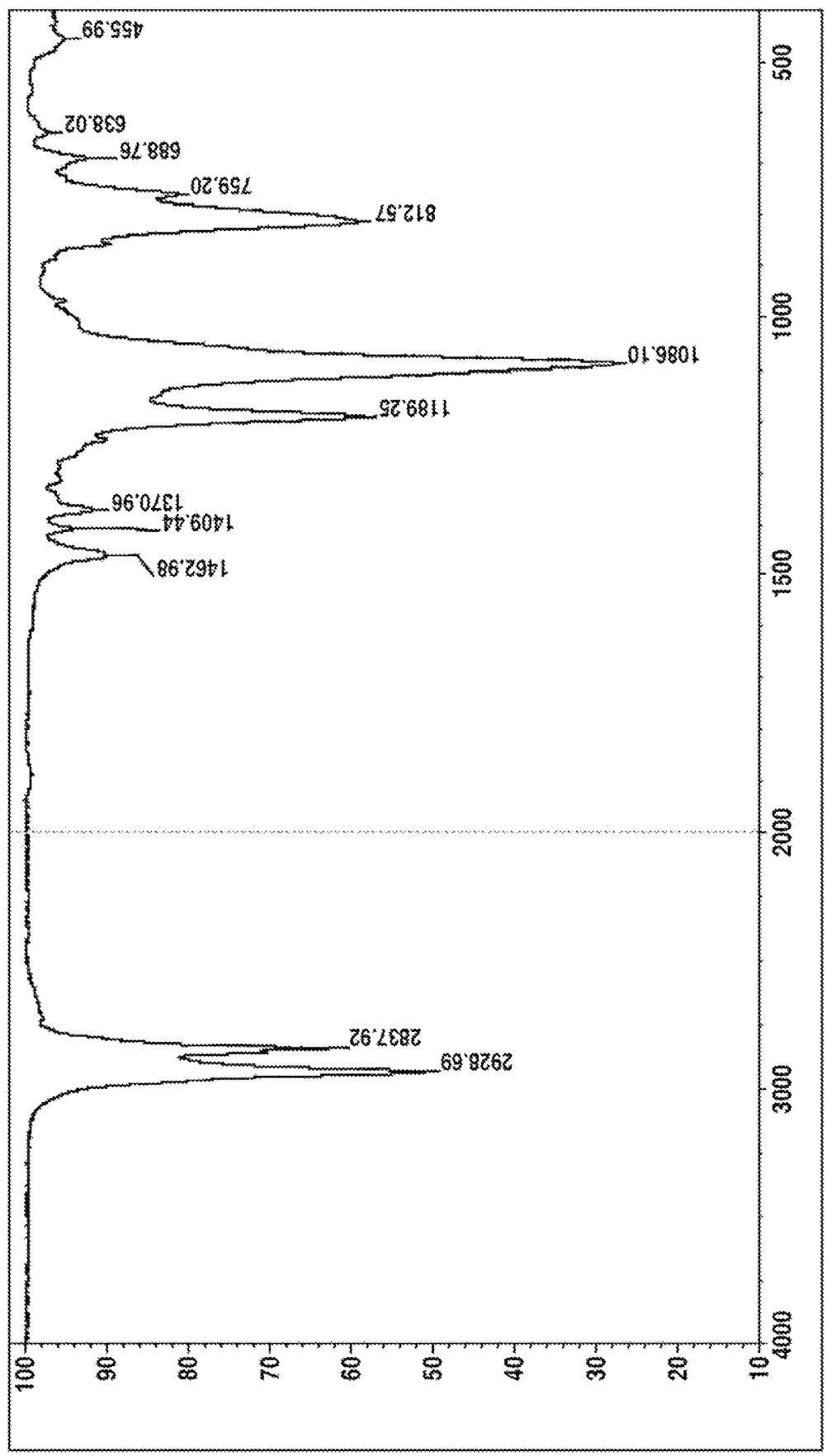
FIG. 1 is a diagram showing an IR spectrum of 2,2-dimethoxy-N-(trimethoxysilyloctyl)-1-aza-2-silacyclopentane obtained in Example 1-1.

Hereinafter, the present invention is described in detail.

[1] Cyclic Silazane Compound Having Alkoxysilyl Group

The cyclic silazane compound having an alkoxysilyl group according to the present invention (hereinafter, referred to as a "compound (1)") has the following general formula (1).

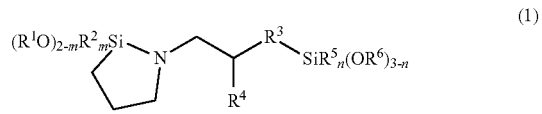

(1)

In the general formula (1), $R^1$, $R^2$, $R^5$ and $R^6$ are each independently an unsubstituted monovalent hydrocarbon group having 1 to 10, preferably 1 to 6, more preferably 1 to 3 carbon atoms.

The monovalent hydrocarbon groups of $R^1$, $R^2$, $R^5$ and $R^6$ may be linear, branched or cyclic, and specific examples thereof include linear alkyl groups such as methyl, ethyl, n-propyl, n-butyl, n-pentyl, n-hexyl, n-heptyl, n-octyl and decyl groups; branched alkyl groups such as isopropyl, isobutyl, sec-butyl, tert-butyl, neopentyl, thexyl and 2-ethylhexyl groups; cyclic alkyl groups such as cyclopentyl and cyclohexyl groups; alkenyl groups such as vinyl, propenyl, butenyl and pentenyl groups; aryl groups such as phenyl and tolyl groups; and aralkyl groups such as benzyl and phenethyl groups.

Among them, linear alkyl groups and alkenyl groups are preferable from the viewpoint of availability of raw materials.

$R^4$ is a hydrogen atom or an unsubstituted monovalent hydrocarbon group having 1 to 10, preferably 1 to 6, more preferably 1 to 3 carbon atoms. Examples of the monovalent hydrocarbon group of $R^4$ include the same substituents as those of $R^1$, and a hydrogen atom or a methyl group is particularly preferable from the viewpoint of availability of raw materials.

m is 0 or 1, and n is 0, 1, or 2.

R³ is a divalent hydrocarbon group having 4 to 20, preferably 4 to 10, more preferably 4 to 6 carbon atoms, which may contain a sulfur atom, an ester bond or a urea bond.

The divalent hydrocarbon group of R³ may be linear, branched or cyclic, and specific examples thereof include linear alkylene groups such as tetramethylene, hexamethylene, octamethylene and decylene groups; branched alkylene groups such as methyltrimethylene and methyltetramethylene groups; cyclic alkylene groups such as cyclohexylene and methylenecyclohexylenemethylene groups; linear alkenylene groups such as butenylene, hexenylene and octenylene groups; branched alkenylene groups such as an isobutenylene group; arylene groups such as phenylene; and aralkylene groups such as methylenephenylene and methylenephenylenemethylene groups.

Among them, linear alkylene groups are preferable from the viewpoint of availability of raw materials.

Examples of the divalent hydrocarbon group where R³ contains a sulfur atom include thioalkylene groups having 4 to 20, preferably 4 to 10, more preferably 4 to 6 carbon atoms, and alkylenethioalkylene groups.

Examples of the divalent hydrocarbon group where R³ contains an ester bond include substituents of the following general formula (5), and examples of the divalent hydrocarbon group where R³ contains a urea bond include substituents of the following general formula (6).

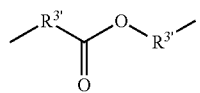

(5)

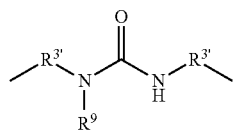

(6)

In the general formulae (5) and (6), R³'s are each independently a single bond or a divalent hydrocarbon group having 1 to 10, preferably 1 to 6, more preferably 1 to 3 carbon atoms, and the total number of carbon atoms in two R³'s is equal to that in R³. Examples of the divalent hydrocarbon group of R³' include methylene, ethylene, trimethylene and propylene groups in addition to the divalent hydrocarbon groups having 4 to 10 carbon atoms as exemplified for R³.

In the general formula (6), R⁹ is a hydrogen atom or an unsubstituted monovalent hydrocarbon group having 1 to 10, preferably 1 to 6, more preferably 1 to 3 carbon atoms. Examples of the monovalent hydrocarbon group of R⁹ include the same substituents as those of R¹, and a hydrogen atom is particularly preferable from the viewpoint of availability of raw materials.

Specific examples of the compound (1) include cyclic silazane compounds having a trialkoxysilylalkyl group, such as 2,2-dimethoxy-N-(trimethoxysilylhexyl)-1-aza-2-silacyclopentane, 2,2-dimethoxy-N-(trimethoxysilyloctyl)-1-aza-2-silacyclopentane, 2-methoxy-2-methyl-N-(trimethoxysilylhexyl)-1-aza-2-silacyclopentane, 2-methoxy-2-methyl-N-(trimethoxysilyloctyl)-1-aza-2-silacyclopentane, 2,2-diethoxy-N-(triethoxysilylhexyl)-1-aza-2-silacyclopentane, 2,2-diethoxy-N-(triethoxysilyloctyl)-1-aza-2-silacyclopentane, 2-ethoxy-2-methyl-N-(triethoxysilylhexyl)-1-aza-2-silacyclopentane, 2-ethoxy-2-methyl-N-(triethoxysilyloctyl)-1-aza-2-silacyclopentane, 2,2-dimethoxy-N-(trimethoxysilylthioethyl)-1-aza-2-silacyclopentane, 2,2-dimethoxy-N-(trimethoxysilylthioethyl)-1-aza-2-silacyclopentane, 2-methoxy-2-methyl-N-(trimethoxysilylthioethyl)-1-aza-2-silacyclopentane, 2-methoxy-2-methyl-N-(trimethoxysilylthioethyl)-1-aza-2-silacyclopentane, 2,2-dimethoxy-N-(trimethoxysilylthiopropyl)-1-aza-2-silacyclopentane, 2,2-dimethoxy-N-(trimethoxysilylthiopropyl)-1-aza-2-silacyclopentane, 2-methoxy-2-methyl-N-(trimethoxysilylthiopropyl)-1-aza-2-silacyclopentane, 2-methoxy-2-methyl-N-(trimethoxysilylthiopropyl)-1-aza-2-silacyclopentane, 2,2-dimethoxy-N-(3-trimethoxysilylpropoxycarbonylethyl)-1-aza-2-silacyclopentane, 2,2-diethoxy-N-(3-triethoxysilylpropoxycarbonylethyl)-1-aza-2-silacyclopentane, 2,2-dimethoxy-N-(3-trimethoxysilylpropoxycarbonyl(methyl)ethyl)-1-aza-2-silacyclopentane, 2,2-diethoxy-N-(3-triethoxysilylpropoxycarbonyl(methyl)ethyl)-1-aza-2-silacyclopentane, 2,2-dimethoxy-N-(3-trimethoxysilylpropylureidoethyl)-1-aza-2-silacyclopentane, 2-methoxy-2-methyl-N-(3-trimethoxysilylpropylureidoethyl)-1-aza-2-silacyclopentane, 2,2-diethoxy-N-(3-triethoxysilylpropylureidoethyl)-1-aza-2-silacyclopentane and 2-ethoxy-2-methyl-N-(3-triethoxysilylpropylureidoethyl)-1-aza-2-silacyclopentane; cyclic silazane compounds having an alkyldialkoxysilylalkyl group, such as 2,2-dimethoxy-N-(methyldimethoxysilylhexyl)-1-aza-2-silacyclopentane, 2,2-dimethoxy-N-(methyldimethoxysilyloctyl)-1-aza-2-silacyclopentane, 2-methoxy-2-methyl-N-(methyldimethoxysilylhexyl)-1-aza-2-silacyclopentane, 2-methoxy-2-methyl-N-(methyldimethoxysilyloctyl)-1-aza-2-silacyclopentane, 2,2-diethoxy-N-(methyldiethoxysilylhexyl)-1-aza-2-silacyclopentane, 2,2-diethoxy-N-(methyldiethoxysilyloctyl)-1-aza-2-silacyclopentane, 2-ethoxy-2-methyl-N-(methyldiethoxysilylhexyl)-1-aza-2-silacyclopentane, 2-ethoxy-2-methyl-N-(methyldiethoxysilyloctyl)-1-aza-2-silacyclopentane, 2,2-dimethoxy-N-(methyldimethoxysilylthioethyl)-1-aza-2-silacyclopentane, 2,2-dimethoxy-N-(methyldimethoxysilylthioethyl)-1-aza-2-silacyclopentane, 2-methoxy-2-methyl-N-(methyldimethoxysilylthioethyl)-1-aza-2-silacyclopentane, 2-methoxy-2-methyl-N-(methyldimethoxysilylthioethyl)-1-aza-2-silacyclopentane, 2,2-dimethoxy-N-(methyldimethoxysilylthiopropyl)-1-aza-2-silacyclopentane, 2,2-dimethoxy-N-(methyldimethoxysilylthiopropyl)-1-aza-2-silacyclopentane, 2-methoxy-2-methyl-N-(methyldimethoxysilylthiopropyl)-1-aza-2-silacyclopentane, 2-methoxy-2-methyl-N-(methyldimethoxysilylthiopropyl)-1-aza-2-silacyclopentane, 2,2-dimethoxy-N-(3-methyldimethoxysilylpropoxycarbonylethyl)-1-aza-2-silacyclopentane, 2,2-diethoxy-N-(3-methyldiethoxysilylpropoxycarbonylethyl)-1-aza-2-silacyclopentane, 2,2-dimethoxy-N-(3-methyldimethoxysilylpropoxycarbonyl(methyl)ethyl)-2-aza-1-silacyclopentane and 2,2-diethoxy-N-(3-methyldiethoxysilylpropoxycarbonyl(methyl)ethyl)-1-aza-2-silacyclopentane; and cyclic silazane compounds having a dialkylalkoxysilylalkyl group, such as 2,2-dimethoxy-N-(dimethylmethoxysilylhexyl)-1-aza-2-silacyclopentane, 2,2-dimethoxy-N-(dimethylmethoxysilyloctyl)-1-aza-2-silacyclopentane, 2-methoxy-2-methyl-N-(dimethylmethoxysilylhexyl)-1-aza-2-silacyclopentane, 2-methoxy-2- methyl-N-(dimethylmethoxysilyloctyl)-1-aza-2-silacyclopentane, 2,2-dimethoxy-N-(diethylmethoxysilylhexyl)-1-aza-2-silacyclopentane, 2,2-dimethoxy-N-(diethylmethoxysilyloctyl)-1-aza-2-silacyclopentane, 2-methoxy-2-methyl-N-(diethylmethoxysilylhexyl)-1-aza-2-silacyclopentane, 2-methoxy-2-methyl-N-(diethylmethoxysilyloctyl)-1-aza-2-silacyclopentane, 2,2-dimethoxy-N-(diphenylmethoxysilylhexyl)-1-aza-2-silacyclopentane, 2,2-dimethoxy-N-(diphenylmethoxysilyloctyl)-1-aza-2-silacyclopentane, 2-methoxy-2-methyl-N-(diphenylmethoxysilylhexyl)-1-aza-2-silacyclopentane and 2-methoxy-2-methyl-N-(diphenylmethoxysilyloctyl)-1-aza-2-silacyclopentane.

[2] Method for Producing Cyclic Silazane Compound Having Alkoxysilyl Group

Next, a method for producing the compound (1) is described.

The compound (1) of the present invention can be obtained by, for example, a method including intramolecularly dealcoholizing and cyclizing a bis(alkoxysilylalkyl)aminosilane compound of the following general formula (2) (hereinafter, referred to as a "compound (2)") (hereinafter, referred to as a "production method A") and a method including reacting a cyclic silazane compound of the following general formula (3) (hereinafter, referred to as a "compound (3)") with an alkoxysilane compound of the following general formula (4) (hereinafter, referred to as a "compound (4)") (hereinafter, referred to as a "production method B").

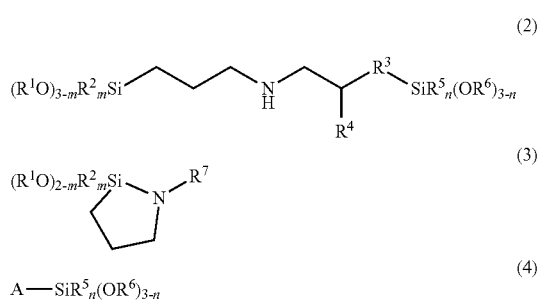

wherein $R^1$ to $R^6$, m and n represent the same meaning as described above.

(1) Production Method A

First, the production method A is described.

Examples of the production method A include a first method in which the compound (2) is intramolecularly cyclized by heating preferably in the presence of a catalyst and the resulting alcohol component is removed outside of the system, and a second method in which the compound (2) is heated and intramolecularly cyclized by heating preferably in the presence of a catalyst and the resulting alcohol component is trapped with a silazane compound.

Specific examples of the compound (2) include (trialkoxysilylpropyl)-(trialkoxysilylalkyl) compounds such as (trimethoxysilylpropyl)-(trimethoxysilylhexyl)amine, (trimethoxysilylpropyl)-(trimethoxysilyloctyl)amine, (triethoxysilylpropyl)-(triethoxysilylhexyl)amine, (triethoxysilylpropyl)-(triethoxysilyloctyl)amine, (trimethoxysilylpropyl)-(trimethoxysilylpropylthioethyl)amine, (trimethoxysilylpropyl)-(trimethoxysilylpropylthiopropyl)amine, (trimethoxysilylpropyl)-(trimethoxysilylpropoxycarbonylethyl)amine and (trimethoxysilylpropyl)-(trimethoxysilylpropoxycarbonyl(methyl)ethyl)amine; (alkyldialkoxysilylpropyl)-(trialkoxysilylalkyl)amine compounds such as (methyldimethoxysilylpropyl)-(trimethoxysilylhexyl)amine, (methyldimethoxysilylpropyl)-(trimethoxysilyloctyl)amine, (methyldiethoxysilylpropyl)-(triethoxysilyloctyl)amine, (methyldiethoxysilylpropyl)-(triethoxysilyloctyl)amine, (methyldimethoxysilylpropyl)-(trimethoxysilylpropylthioethyl)amine and (methyldimethoxysilylpropyl)-(trimethoxysilylpropylthioethyl)amine; (trialkoxysilylpropyl)-(alkyldialkoxysilylalkyl)amine compounds such as (trimethoxysilylpropyl)-(methyldimethoxysilylhexyl)amine, (trimethoxysilylpropyl)-(methyldimethoxysilyloctyl)amine, (triethoxysilylpropyl)-(methyldiethoxysilylhexyl)amine, (triethoxysilylpropyl)-(methyldiethoxysilyloctyl)amine, (trimethoxysilylpropyl)-(methyldimethoxysilylpropoxycarbonylethyl)amine and (trimethoxysilylpropyl)-(methyldimethoxysilylpropoxycarbonyl(methyl)ethyl)amine; (alkyldialkoxysilylpropyl)-(alkyldialkoxysilylalkyl)amine compounds such as (methyldimethoxysilylpropyl)-(methyldimethoxysilylhexyl)amine, (methyldimethoxysilylpropyl)-(methyldimethoxysilyloctyl)amine, (methyldiethoxysilylpropyl)-(methyldiethoxysilylhexyl)amine and (methyldiethoxysilylpropyl)-(methyldiethoxysilyloctyl)amine; and (trialkoxysilylpropyl)-(dialkylalkoxysilylalkyl)amine compounds such as (trimethoxysilylpropyl)-(dimethylmethoxysilylhexyl)amine, (trimethoxysilylpropyl)-(dimethylmethoxysilyloctyl)amine, (triethoxysilylpropyl)-(dimethylethoxysilylhexyl)amine and (triethoxysilylpropyl)-(dimethylethoxysilyloctyl)amine.

The compound (2) can be obtained by, for example, reacting a chloroalkylalkoxysilane compound with an aminopropylalkoxysilane compound or reacting a chloropropylalkoxysilane compound with an aminoalkylalkoxysilane compound.

Examples of the catalyst in the first method include acidic compounds or basic compounds.

Specific examples of the acidic compound include carboxylic acids such as acetic acid, propionic acid, hexanoic acid, octanoic acid, succinic acid, benzoic acid and trifluoroacetic acid; sulfonic acids such as methanesulfonic acid, dodecylbenzenesulfonic acid, trifluoromethanesulfonic acid and nonafluorobutanesulfonic acid; Broensted acid acids such as sulfonimides such as O-benzsulfonimide and dibenzenesulfonimide, and Lewis acids such as zinc chloride, aluminum chloride, magnesium chloride and trimethylsilyl trifluoromethanesulfonate, and these compounds may be used alone or used in combination of two or more thereof.

On the other hand, specific examples of the basic compound include alkali metal hydroxides such as potassium hydroxide, sodium hydroxide and cesium hydroxide; alkali metal alkoxides such as potassium methoxide, sodium methoxide, potassium ethoxide and sodium ethoxide; and quaternary ammonium hydroxides having an alkyl or aryl group, such as tetramethylammonium hydroxide, tetraethylammonium hydroxide, tetrapropylammonium hydroxide, tetrabutylammonium hydroxide and trimethylbenzylammonium hydroxide, and these compounds may be used alone or used in combination of two or more thereof.

In the first method, the amount of the catalyst added is preferably 0.0001 to 0.1 mol, more preferably 0.001 to 0.05 mol per 1 mol of the alcohol component generated.

The reaction temperature is preferably 0 to 200° C., more preferably 40 to 200° C.

The reaction time is preferably 30 to 600 minutes, more preferably 60 to 300 minutes, still more preferably 60 to 150 minutes.

The reaction in the first method proceeds even under normal pressure, and it is preferable that the reaction is carried out under reduced pressure for rapidly removing the generated alcohol.

The reaction in the first method proceeds even without a solvent, and it is possible to use a solvent. Examples of the solvent used include hydrocarbon-based solvents such as pentane, hexane, cyclohexane, isooctane, benzene, toluene and xylene; ether-based solvents such as diethyl ether, tetrahydrofuran and dioxane; aprotic polar solvents such as acetonitrile, N,N-dimethylformamide; and chlorinated hydrocarbon-based solvents such as dichloromethane and chloroform, and these solvents may be used alone or use in combination of two or more thereof.

Next, as the catalyst in the second method, the Broensted acids mentioned in the first method are suitable, and the amount of the catalyst added is the same as in the case of the catalyst in the first method.

The reaction temperature in the second method is preferably 80 to 200° C., more preferably 110 to 200° C.

The reaction time is preferably 60 to 600 minutes, more preferably 120 to 300 minutes.

The reaction in the second method proceeds even under reduced pressure, and it is preferable that the reaction is carried out under normal pressure for making the reaction temperature as high as possible.

Specific examples of the silazane compound used in the second method include tetramethyldisilazane, hexamethyldisilazane, dimethylaminotrimethylsilane, diethylaminotrimethylsilane, N-trimethylsilylaniline, N-trimethylsilyl-N-methylanaline, morpholinotrimethylsilane, piperidinotrimethylsilane, 2-methyl-trimethylsilylpiperidine, N,O-bis(trimethylsilyl)acetamide and N,O-bis(trimethylsilyl)trifluoroacetamide.

For the amount of such a silazane compound used, the number of moles of silicon in the silazane compound is preferably 0.5 to 10, more preferably 0.8 to 2 per 1 mol of the alcohol component generated.

The reaction in the second method proceeds even without a solvent, and it is possible to use a solvent. Examples of the solvent used include the same solvents as in the first method.

(2) Production Method B

Next, the production method B, which is a method including reacting the compound (3) with the compound (4), is described.

In the general formula (3), $R^7$ is a monovalent hydrocarbon group having 1 to 18, preferably 1 to 10, more preferably 2 to 8 carbon atoms and having an unsaturated bond or an amino group at the terminal thereof.

The monovalent hydrocarbon group having an unsaturated bond may be linear, branched or cyclic, and specific examples thereof include linear alkenyl groups such as allyl, butenyl, hexenyl and octenyl groups; branched alkenyl groups such as an isobutenyl group; and alkenyl groups including an aromatic hydrocarbon group, such as styryl (vinylphenyl) and allylphenyl groups.

On the other hand, examples of the monovalent hydrocarbon group having an amino group include linear aminoalkyl groups such as aminoethyl, aminopropyl, aminohexyl and aminooctyl groups; and aminoaryl groups such as aminophenyl groups.

Among them, linear alkenyl groups and linear aminoalkyl groups are preferable from the viewpoint of availability of raw materials.

Specific examples of the compound (3) include cyclic silazane groups having an unsaturated bond, such as 2,2-dimethoxy-N-allyl-1-aza-2-silacyclopentane, 2,2-dimethoxy-N-butenyl-1-aza-2-silacyclopentane, 2,2-dimethoxy-N-hexenyl-1-aza-2-silacyclopentane, 2,2-dimethoxy-N-octenyl-1-aza-2-silacyclopentane, 2,2-dimethoxy-N-styryl-1-aza-2-silacyclopentane, 2-methoxy-2-methyl-N-allyl-1-aza-2-silacyclopentane, 2-methoxy-2-methyl-N-butenyl-1-aza-2-silacyclopentane, 2-methoxy-2-methyl-N-hexenyl-1-aza-2-silacyclopentane, 2-methoxy-2-methyl-N-octenyl-1-aza-2-silacyclopentane, 2-methoxy-2-methyl-N-styryl-1-aza-2-silacyclopentane, 2,2-diethoxy-N-allyl-1-aza-2-silacyclopentane, 2,2-diethoxy-N-butenyl-1-aza-2-silacyclopentane, 2,2-diethoxy-N-hexenyl-1-aza-2-silacyclopentane, 2,2-diethoxy-N-octenyl-1-aza-2-silacyclopentane, 2,2-diethoxy-N-styryl-1-aza-2-silacyclopentane, 2-ethoxy-2-methyl-N-allyl-1-aza-2-silacyclopentane, 2-ethoxy-2-methyl-N-butenyl-1-aza-2-silacyclopentane, 2-ethoxy-2-methyl-N-hexenyl-1-aza-2-silacyclopentane, 2-ethoxy-2-methyl-N-octenyl-1-aza-2-silacyclopentane and 2-ethoxy-2-methyl-N-styryl-1-aza-2-silacyclopentane; and cyclic silazane compounds having an amino group, such as 2,2-dimethoxy-N-aminoethyl-1-aza-2-silacyclopentane, 2,2-dimethoxy-N-aminopropyl-1-aza-2-silacyclopentane, 2,2-dimethoxy-N-aminohexyl-1-aza-2-silacyclopentane, 2,2-dimethoxy-N-aminooctyl-1-aza-2-silacyclopentane, 2,2-dimethoxy-N-aminophenyl-1-aza-2-silacyclopentane, 2-methoxy-2-methyl-N-aminoethyl-1-aza-2-silacyclopentane, 2-methoxy-2-methyl-N-aminopropyl-1-aza-2-silacyclopentane, 2-methoxy-2-methyl-N-aminohexyl-1-aza-2-silacyclopentane, 2-methoxy-2-methyl-N-aminooctyl-1-aza-2-silacyclopentane, 2-methoxy-2-methyl-N-aminophenyl-1-aza-2-silacyclopentane, 2,2-diethoxy-N-aminoethyl-1-aza-2-silacyclopentane, 2,2-diethoxy-N-aminopropyl-1-aza-2-silacyclopentane, 2,2-diethoxy-N-aminohexyl-1-aza-2-silacyclopentane, 2,2-diethoxy-N-aminooctyl-1-aza-2-silacyclopentane, 2,2-diethoxy-N-aminophenyl-1-aza-2-silacyclopentane, 2-ethoxy-2-methyl-N-aminoethyl-1-aza-2-silacyclopentane, 2-ethoxy-2-methyl-N-aminopropyl-1-aza-2-silacyclopentane, 2-ethoxy-2-methyl-N-aminohexyl-1-aza-2-silacyclopentane, 2-ethoxy-2-methyl-N-aminooctyl-1-aza-2-silacyclopentane and 2-ethoxy-2-methyl-N-aminophenyl-1-aza-2-silacyclopentane.

The compound (3) can be obtained by intramolecularly cyclizing an aminosilane compound having $R^7$ as a substituent on nitrogen.

In the compound (4), A is a hydrogen atom, a mercaptoalkyl group having 1 to 8 carbon atoms or an isocyanatoalkyl group having 1 to 8 carbon atoms.

First, the production method B is described where A is a hydrogen atom, i.e. a hydrogen silane compound of the following general formula (7) (hereinafter, referred to as a "compound (7)") is used. In this case, $R^7$ in the compound (3) is a monovalent hydrocarbon group having 1 to 18 carbon atoms and necessarily having an unsaturated bond at the terminal thereof.

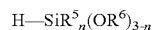

$$H—SiR^5{}_n(OR^6)_{3-n} \qquad (7)$$

wherein $R^5$, $R^6$ and n represent the same meaning as described above.

Specific examples of the compound (7) include trimethoxysilane, methyldimethoxysilane, triethoxysilane and methyldiethoxysilane.

The compounding ratio of the compound (3) to the compound (7) is not particularly limited, and from the viewpoint of productivity, the amount of the compound (7) is preferably 0.5 to 1.5 mol, more preferably 0.8 to 1.2 mol, still more preferably 0.8 to 1.05 mol, per 1 mol of unsaturated bonds in the compound (3).

When the compound (3) is reacted with the compound (7), a platinum compound can be used as a catalyst.

Specific examples of the platinum compound include chloroplatinic acid, alcohol solutions of chloroplatinic acid, toluene or xylene solutions of a platinum-1, 3-divinyl-1,1, 3,3-tetramethyldisiloxane complex, tetrakistriphenylphosphine platinum, dichlorobistriphenylphosphine platinum, dichlorobisacetonitrile platinum, dichlorobisbenzonitrile platinum, dichlorocyclooctadiene platinum and platinum-activated carbon.

The amount of the platinum compound used is not particularly limited, and is preferably 0.000001 to 0.2 mol, more preferably 0.00001 to 0.1 mol, per 1 mol of unsaturated bonds in the compound (3), from the viewpoint of productivity.

The reaction temperature in the reaction is not particularly limited, and is preferably 0 to 200° C., more preferably 20 to 150° C.

The reaction time is not particularly limited, and is preferably 1 to 40 hours, more preferably 1 to 20 hours.

For preventing deactivation of the catalyst and hydrolysis of the compound (3) and the compound (7), it is preferable to carry out the reaction in an atmosphere of an inert gas such as nitrogen or argon.

The reaction proceeds even without a solvent, and it is possible to use a solvent.

Specific examples of the solvent include aliphatic hydrocarbon-based solvents having 5 to 20 carbon atoms, such as pentane, hexane, cyclohexane, heptane, octane, nonane, decane, isooctane and isododecane; and aromatic hydrocarbon-based solvents having 6 to 10 carbon atoms, such as benzene, toluene and xylene, and toluene and xylene are particularly preferable from the viewpoint of solubility of the catalyst. These solvents may be used alone or used in combination of two or more thereof.

Next, the production method B is described where A is a mercaptoalkyl group having 1 to 8 carbon atoms, i.e. a mercaptoalkylalkoxysilane compound of the following general formula (8) (hereinafter, referred to as a "compound (8)") is used. In this case, $R^7$ in the compound (3) is a monovalent hydrocarbon group having 1 to 18 carbon atoms and necessarily having an unsaturated bond at the terminal thereof.

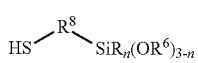

(8)

wherein $R^5$, $R^6$ and n represent the same meaning as described above.

In the general formula (8), $R^8$ is an unsubstituted divalent hydrocarbon group having 1 to 8, preferably 1 to 5, more preferably 1 to 3 carbon atoms.

The divalent hydrocarbon group of $R^8$ may be linear or branched, and specific examples thereof include linear alkylene groups such as methylene, ethylene, trimethylene, tetramethylene, hexamethylene, octamethylene and decylene groups; branched alkylene groups such as methyltrimethylene and methyltetramethylene; cyclic alkylene groups such as cyclohexylene and methylenecyclohexylenemethylene; linear alkenylene groups such as propenylene, butenylene, hexenylene and octenylene; branched alkenylene groups such as an isobutenylene group; arylene groups such as phenylene; and aralkylene groups such as methylenephenylene and methylenephenylenemethylene.

Among them, linear alkylene groups are preferable from the viewpoint of availability of raw materials.

Specific examples of the compound (8) include mercaptoalkyltrialkoxysilane compounds such as mercaptomethyltrimethoxysilane, mercaptopropyltrimethoxysilane, mercaptohexyltrimethoxysilane, mercaptooctyltrimethoxysilane, mercaptomethyltriethoxysilane, mercaptopropyltriethoxysilane, mercaptohexyltriethoxysilane and mercaptooctyltriethoxysilane; mercaptoalkylalkylalkyldialkoxysilane compounds such as mercaptomethylmethyldimethoxysilane, mercaptopropylmethyldimethoxysilane, mercaptohexylmethyldimethoxysilane, mercaptooctylmethyldimethoxysilane, mercaptomethylmethyldiethoxysilane, mercaptopropylmethyldiethoxysilane, mercaptohexylmethyldiethoxysilane and mercaptooctylmethyldiethoxysilane; and mercaptoalkyldialkylalkoxysilane compounds such as mercaptomethylmethyldimethylmethoxysilane, mercaptopropyldimethylmethoxysilane, mercaptohexyldimethylmethoxysilane, mercaptooctyldimethylmethoxysilane, mercaptomethyldimethylethoxysilane, mercaptopropyldimethylethoxysilane, mercaptohexyldimethylethoxysilane and mercaptooctyldimethylethoxysilane.

The compounding ratio of the compound (3) to the compound (8) is not particularly limited, and from the viewpoint of productivity, the amount of the compound (8) is 0.5 to 1.5 mol, more preferably 0.8 to 1.2 mol, still more preferably 0.8 to 1.05 mol, per 1 mol of unsaturated bonds in the compound (3).

When the compound (3) is reacted with the compound (8), a radical generator can be used as a catalyst.

Specific examples of the radical generator include organic peroxides such as tert-butyl hydroperoxide, ditert-butyl peroxide and benzoyl peroxide, and azo compounds such as azobisisobutyronitrile and azobis-2-methylbutyronitrile, and azo compounds are particularly preferable.

The amount of the radical generator used is not particularly limited, and is preferably 0.0001 to 0.2 mol, more preferably 0.001 to 0.1 mol, per 1 mol of unsaturated bonds in the compound (3), from the viewpoint of productivity.

The reaction temperature in the reaction is not particularly limited, and is preferably 0 to 200° C., more preferably 20 to 150° C.

In addition, the reaction time is not particularly limited, and is preferably 1 to 40 hours, more preferably 1 to 20 hours.

For preventing deactivation of the catalyst and hydrolysis of the compound (3) and the compound (8), it is preferable to carry out the reaction in an atmosphere of an inert gas such as nitrogen or argon.

The reaction proceeds even without a solvent, and it is possible to use a solvent.

Specific examples of the solvent include the same solvents as in the case where A is a hydrogen atom.

Finally, the production method B is described where A is an isocyanatoalkyl group having 1 to 8 carbon atoms, i.e. an isocyanatoalkylalkoxysilane compound of the following general formula (9) (hereinafter, referred to as a "compound (9)") is used. In this case, $R^7$ in the compound (3) necessarily has an amino group at the terminal.

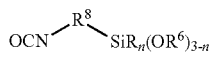

(9)

wherein $R^5$, $R^6$, $R^8$ and n represent the same meaning as described above.

Specific examples of the compound (9) include isocyanatoalkyltrialkoxysilane compounds such as isocyanatomethyltrimethoxysilane, isocyanatopropyltrimethoxysilane, isocyanatohexyltrimethoxysilane, isocyanatooctyltrimethoxysilane, isocyanatomethyltriethoxysilane, isocyanatopropyltriethoxysilane, isocyanatohexyltriethoxysilane and isocyanatooctyltriethoxysilane; isocyanatoalkylalkyldialkoxysilane compounds such as isocyanatomethylmethyldimethoxysilane, isocyanatopropylmethyldimethoxysilane, isocyanatohexylmethyldimethoxysilane, isocyanatooctylmethyldimethoxysilane, isocyanatomethylmethyldiethoxysilane, isocyanatopropylmethyldiethoxysilane, isocyanatohexylmethyldiethoxysilane and isocyanatooctylmethyldiethoxysilane; and isocyanatoalkyldialkylalkoxysilane compounds such as isocyanatomethylmethyldimethylmethoxysilane, isocyanatopropyldimethylmethoxysilane, isocyanatohexyldimethylmethoxysilane, isocyanatooctyldimethylmethoxysilane, isocyanatomethyldimethylethoxysilane, isocyanatopropyldimethylethoxysilane, isocyanatohexyldimethylethoxysilane and isocyanatooctyldimethylethoxysilane.

The compounding ratio of the compound (3) to the compound (9) is not particularly limited, and from the viewpoint of productivity, the amount of the compound (9) is preferably 0.8 to 2 mol, more preferably 0.9 to 1.5 mol, still more preferably 0.9 to 1.05 mol, per 1 mol of free amino groups in the compound (3).

The reaction temperature in the reaction is not particularly limited, and is preferably 0 to 100° C., more preferably 20 to 60° C.

The reaction time is not particularly limited, and is preferably 1 to 40 hours, more preferably 1 to 20 hours.

For preventing deactivation of the catalyst and hydrolysis of the compound (3) and the compound (9), it is preferable to carry out the reaction in an atmosphere of an inert gas such as nitrogen or argon.

The reaction proceeds even without a solvent, and it is possible to use a solvent.

Specific examples of the solvent include the same solvents as in the case where A is a hydrogen atom.

For isolation and purification of the compound (1) that is a target substance, an ordinary purification method in organic synthesis such as stripping under reduced pressure, any of various kinds of chromatography, treatment using an adsorbent, filtration, or distillation can be selected and used. Distillation is particularly preferable from the viewpoint of ease of scale-up.

In addition, the obtained compound (1) may be a mixture with the compound (2) or the compound (3) that is a raw material as long as there is no hindrance in use of the compound (1).

[3] Curable Composition and Cured Product

Next, a curable composition and a cured product according to the present invention are described.

The curable composition of the present invention contains the compound (1), and may contain a solvent, a hydrolyzable silicone compound, a curing catalyst and the like if necessary.

The compounding amount of the compound (1) in the curable composition is not particularly limited, and is preferably 1 to 100 wt %, more preferably 20 to 100 wt %, still more preferably 30 to 100 wt %.

Specific examples of the solvent used if necessary include aliphatic hydrocarbon-based solvents having 5 to 20 carbon atoms, such as pentane, hexane, cyclohexane, heptane, octane, nonane, decane, isooctane and isododecane; aromatic hydrocarbon-based solvents having 6 to 10 carbon atoms, such as benzene, toluene and xylene; ether-based solvents such as diethyl ether, tetrahydrofuran, dioxane and dipropylene glycol dimethyl ether; ester-based solvents such as ethyl acetate and butyl acetate; aprotic polar solvents such as acetonitrile, N,N-dimethylformamide and N-methylpyrrolidone; and silicone-based solvents such as hexamethyldisiloxane, octamethyltrisiloxane, decamethyltetrasiloxane, tris(trimethylsiloxy)methylsilane, octamethylcyclotetrasiloxane and decamethylcyclopentasiloxane, and these solvents may be used alone or used in combination of two or more thereof.

When a solvent is used, the compounding amount thereof is not particularly limited, and is preferably 10 to 99 wt %, more preferably 20 to 80 wt %, still more preferably 30 to 60 wt %, from the viewpoint of workability.

Specific examples of the hydrolyzable group-containing silicone compound that is used if necessary include dialkyldialkoxysilane compounds such as dimethyldimethoxysilane, dimethyldiethoxysilane, diphenyldimethoxysilane, diphenyldiethoxysilane and dicyclopentyldimethoxysilane; alkyltrialkoxysilanes such as methyltrimethoxysilane, methyltriethoxysilane, ethyltrimethoxysilane, ethyltriethoxysilane, propyltrimethoxysilane, propyltriethoxysilane, hexyltrimethoxysilane, hexyltriethoxysilane, octyltrimethoxysilane, octyltriethoxysilane, decyltrimethoxysilane, decyltriethoxysilane, methoxymethyltrimethoxysilane, ethoxymethyltriethoxysilane, phenyltrimethoxysilane and phenyltriethoxysilane; tetraalkoxysilane compounds such as tetramethoxysilane and tetraethoxysilane; and bis(dialkylalkoxysilane) compounds such as 1,4-bis(dimethylethoxysilyl)benzene and 1,4-bis(dimethylethoxysilyl).

As the hydrolyzable group-containing silicone compound, a silane compound may be used as it is, a partial hydrolytic condensate of a silane compound may be used, or a mixture of a silane compound and a partial hydrolysate thereof may be used.

In addition, the partial hydrolytic condensate of the hydrolyzable group-containing silane compound may be a partial hydrolytic condensate of one of hydrolyzable group-containing silane compounds, or may be a partial hydrolytic condensate of two or more of hydrolyzable group-containing silane compounds.

When a hydrolyzable group-containing silicone compound is used, the compounding amount thereof is not particularly limited, and is preferably 0 to 89 wt %, more preferably 20 to 60 wt %, still more preferably 30 to 50 wt %, from the viewpoint of curability.

As the curing catalyst used if necessary, a metal compound such as a titanium compound, an aluminum compound, a zinc compound or a tin compound can be used.

Specific examples of the titanium compound include tetraalkyl orthotitanate such as tetrabutyl orthotitanate, tetramethyl orthotitanate, tetraethyl orthotitanate, tetrapropyl orthotitanate and tetraisopropyl orthotitanate, partial hydrolytic condensates thereof, and titanium acylates.

Specific examples of the aluminum compound include aluminum trihydroxide, aluminum alcoholates, aluminum acylates, salts of aluminum acylates, aluminosyloxy compounds and aluminum metal chelate compounds.

Specific examples of the zinc compound include zinc octylate and zinc 2-ethylhexanoate.

Specific examples of the tin compound include dioctyltin dioctate and dioctyltin dilaurate.

When the curing catalyst is used, the compounding amount thereof is not particularly limited, and is preferably 0.01 to 10 wt %, more preferably 0.1 to 5 wt % per weight of the compound (1) or total weight of the compound (1) and a hydrolyzable group-containing silicone compound used if necessary, from the viewpoint of exhibiting the effect of the catalyst.

The curing catalyst may be added to the curable composition later, or may be added with the curing catalyst dissolved in the above-described solvent or hydrolyzable group-containing silicone compound used if necessary.

The curable composition may contain one or more other additives selected from pigments, antifoaming agents, lubricants, preservatives, pH adjusters, film forming agents, antistatic agents, antibacterial agents, dyes and the like as long as the effects of the curable composition are not impaired.

The cured product of the present invention is one obtained by curing the curable composition, specifically a cured product obtained by curing the curable composition by hydrolytic condensation of an alkoxysilyl group in the compound (1).

When the curable composition contains a solvent, the solvent may be volatilized before the composition is cured, or the composition may be cured while the solvent is volatilized.

Ordinary temperature or a temperature under heating can be employed as a temperature during curing.

The temperature here is not particularly limited as long as the substrate is not adversely affected, and for maintaining reactivity, the temperature is preferably 0 to 250° C., more preferably 20 to 180° C., still more preferably 20 to 150° C.

In addition, the relative humidity is preferably 15 to 100%, more preferably 25 to 80%, because reaction with moisture in the air occurs.

It is also possible to obtain a covered substrate by covering a surface of a substrate such as an inorganic material or an organic material with the curable composition, and then reacting the curable composition with moisture in the air to cure the curable composition.

Specific examples of the inorganic material include metal, glass, silica, alumina, talc, calcium carbonate and carbon. The shape of such a substrate is not particularly limited, and may be a plate shape, a sheet shape, a fibrous shape or a powdered shape.

As the glass, types of glass which are commonly used, such as E glass, C glass and quartz glass can be used, and glass fibers may be used. The glass fibers may be in the form of an aggregate of the glass fibers, for example, a glass-based (filament) fiber bundle having a fiber diameter of 3 to 30 μm, a twisted yarn, or a woven fabric.

Specific examples of the organic material include resin materials such as polyethylene, polypropylene, polystyrene, poly(meth)acryl, polyvinyl chloride, polycarbonate, nylon, polyurethane, polybutylene terephthalate, polyethylene terephthalate, ABS (polymer of acrylonitrile, butadiene and styrene), melamine, phenol, epoxy and polyimide; elastomers such as polybutadiene rubber, polyisopropylene rubber, nitrile rubber, neoprene rubber, polysulfide and urethane rubber; and rubber materials.

The shape of the substrate is not particularly limited, and may be a plate shape, a sheet shape, a fibrous shape or a powdered shape.

Examples of the method for application to the substrate include known application methods such as a brush coating method, a sponge coating method, a cloth coating method, a spray coating method, a wire bar method, a blade method, a roll coating method, a dipping method and a spin coating method.

In addition, for powdered materials such as silica, alumina, talc and calcium carbonate, a mixing method may be employed in which the curable composition is directly mixed together with the substrate by use of a mixer or a mill.

EXAMPLES

Examples and Comparative Examples are given below to more concretely illustrate the invention, although the invention is not limited by these Examples.

Example 1-1

Synthesis of 2,2-dimethoxy-N-(trimethoxysilyloctyl)-1-aza-2-silacyclopentane (Compound 1)

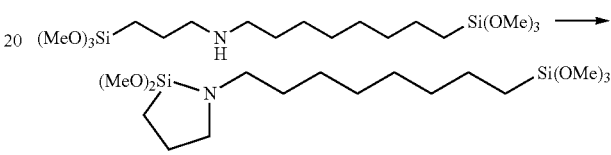

wherein Me represents a methyl group; and the same applies hereinafter.

The inside of a four-necked glass flask equipped with a stirrer, a thermometer, a distillation tower and a reflux condenser was purged with nitrogen, 122 g (0.296 mol) of (trimethoxysilylpropyl)-(trimethoxysilyloctyl)amine, 132 g of toluene and 0.75 g (0.0050 mol) of trifluoromethanesulfonic acid were added, and the mixture was refluxed. To this mixture was added 58.4 g (0.311 mol) of N-trimethylsilyl-N-methylaniline, the mixture was stirred, and generated trimethylmethoxysilane was taken out together with toluene using a distillation column until the temperature reached a reaction temperature of 150° C.

Figure 2:
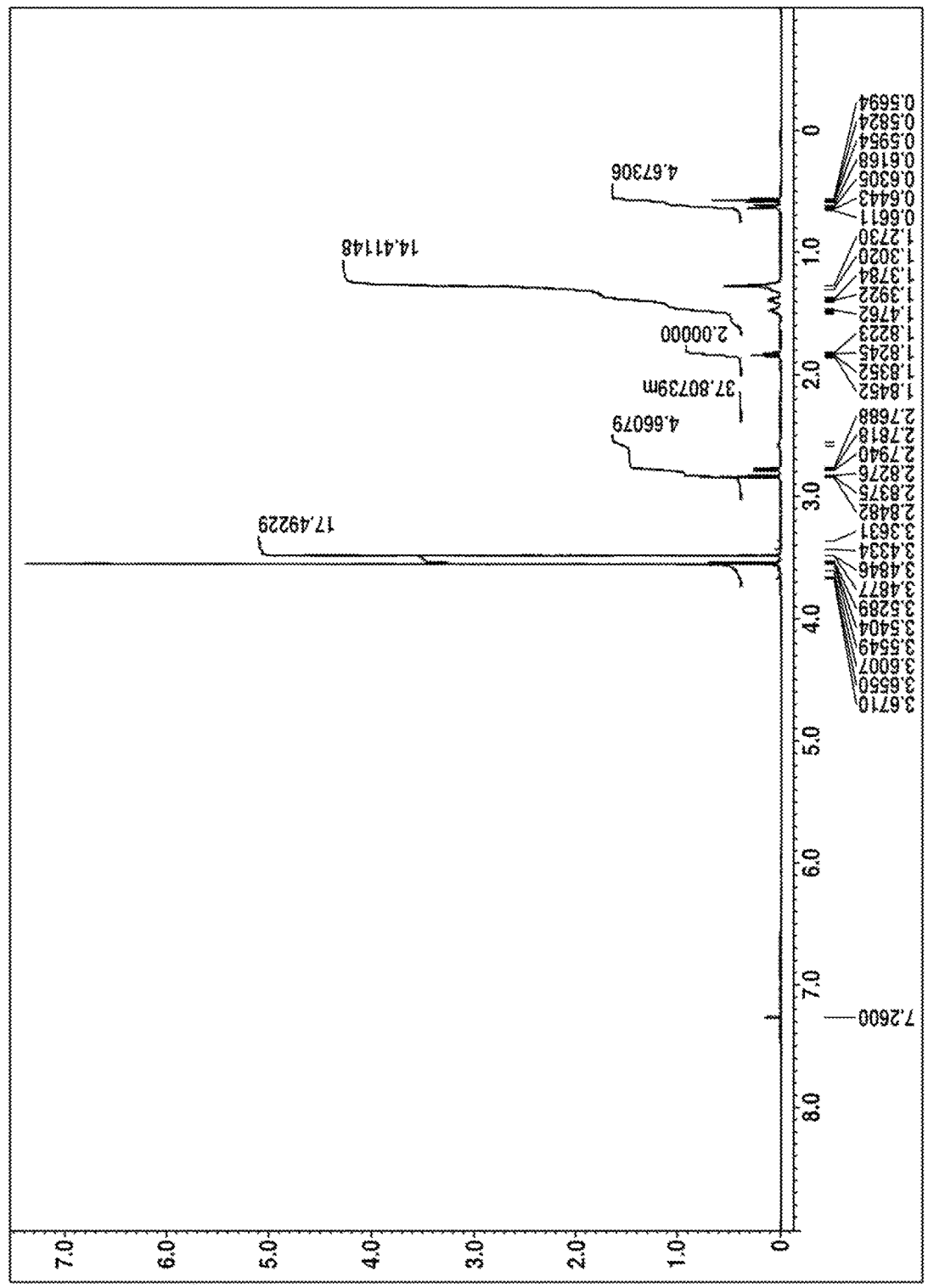
FIG. 2 is a diagram showing a $^1$H-NMR spectrum of 2,2-dimethoxy-N-(trimethoxysilyloctyl)-1-aza-2-silacyclopentane obtained in Example 1-1.

The obtained reaction liquid was distilled to obtain 66 g of a fraction having a boiling point of 170° C./0.5 kPa (yield: 58%). IR and $^1$H-NMR analyses of the obtained fraction were performed. The results are shown in FIGS. 1 and 2.

Example 1-2

Synthesis of 2-ethoxy-2-methyl-N-(trimethoxysilyloctyl)-1-aza-2-silacyclopentane (Compound 2)

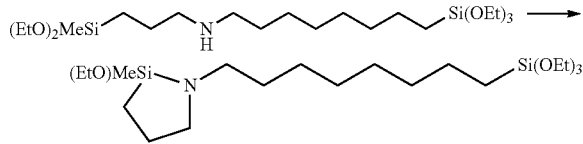

wherein Et represents an ethyl group; and the same applies hereinafter.

The inside of a four-necked glass flask equipped with a stirrer, a thermometer, a distillation tower and a reflux condenser was purged with nitrogen, 162 g (0.348 mol) of (methyldiethoxysilylpropyl)-(triethoxysilyloctyl)amine, 114 g of toluene and 1.0 g (0.0067 mol) of trifluoromethanesulfonic acid were added, and the mixture was refluxed. To this mixture was added 68.5 g (0.382 mol) of N-trimethylsilyl-N-methylaniline, the mixture was stirred, and generated triethylmethoxysilane was taken out together with toluene using a distillation column until the temperature reached a reaction temperature of 150° C.

Figure 3:
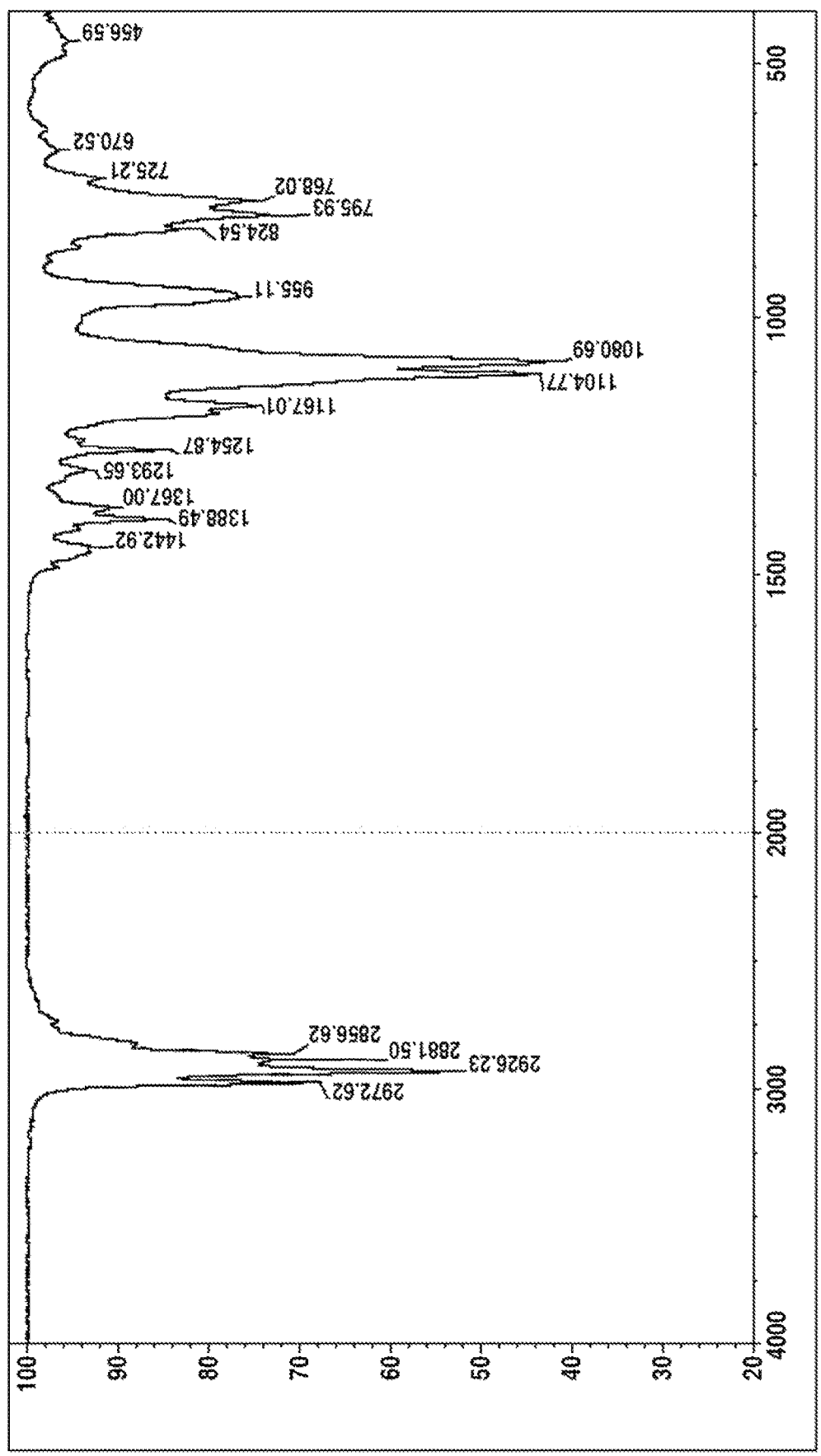
FIG. 3 is a diagram showing an IR spectrum of 2-ethoxy-2-methyl-N-(triethoxysilyloctyl)-1-aza-2-silacyclopentane obtained in Example 1-2.
Figure 4:
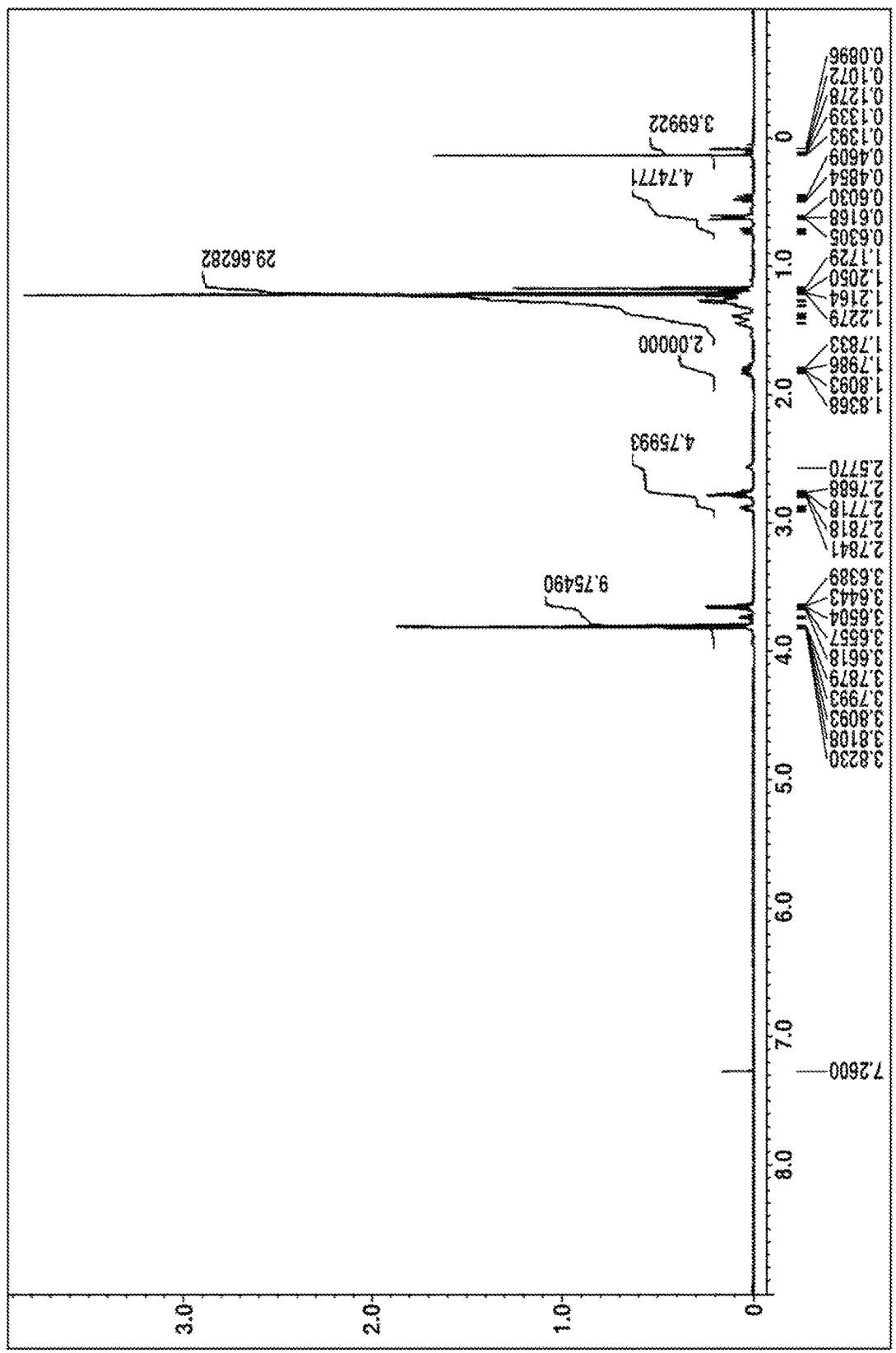
FIG. 4 is a diagram showing a $^1$H-NMR spectrum of 2-ethoxy-2-methyl-N-(triethoxysilyloctyl)-1-aza-2-silacyclopentane obtained in Reference Example 1-3.

The obtained reaction liquid was distilled to obtain 110 g of a fraction having a boiling point of 177° C./0.2 kPa (yield: 75%). IR and $^1$H-NMR analyses of the obtained fraction were performed. The results are shown in FIGS. 3 and 4.

Reference Example 1-3

Synthesis of 2-methoxy-2-methyl-N-(trimethoxysilylpropylthioethyl)-1-aza-2-silacyclopentane (Compound 3)

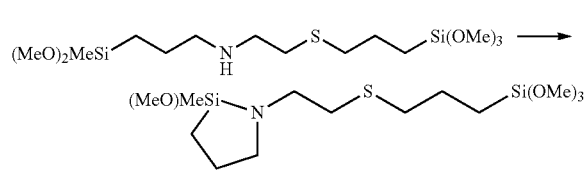

The inside of a four-necked glass flask equipped with a stirrer, a thermometer, a distillation tower and a reflux condenser was purged with nitrogen, 86.0 g (0.221 mol) of (methyldimethoxysilylpropyl)-(trimethoxysilpropylthioethyl)amine, 110 g of toluene and 0.4 g (0.003 mol) of trifluoromethanesulfonic acid were added, and the mixture was refluxed. To this mixture was added 44.0 g (0.245 mol) of N-trimethylsilyl-N-methylaniline, the mixture was stirred, and generated trimethylmethoxysilane was taken out together with toluene using a distillation column until the temperature reached a reaction temperature of 140° C.

Figure 5:
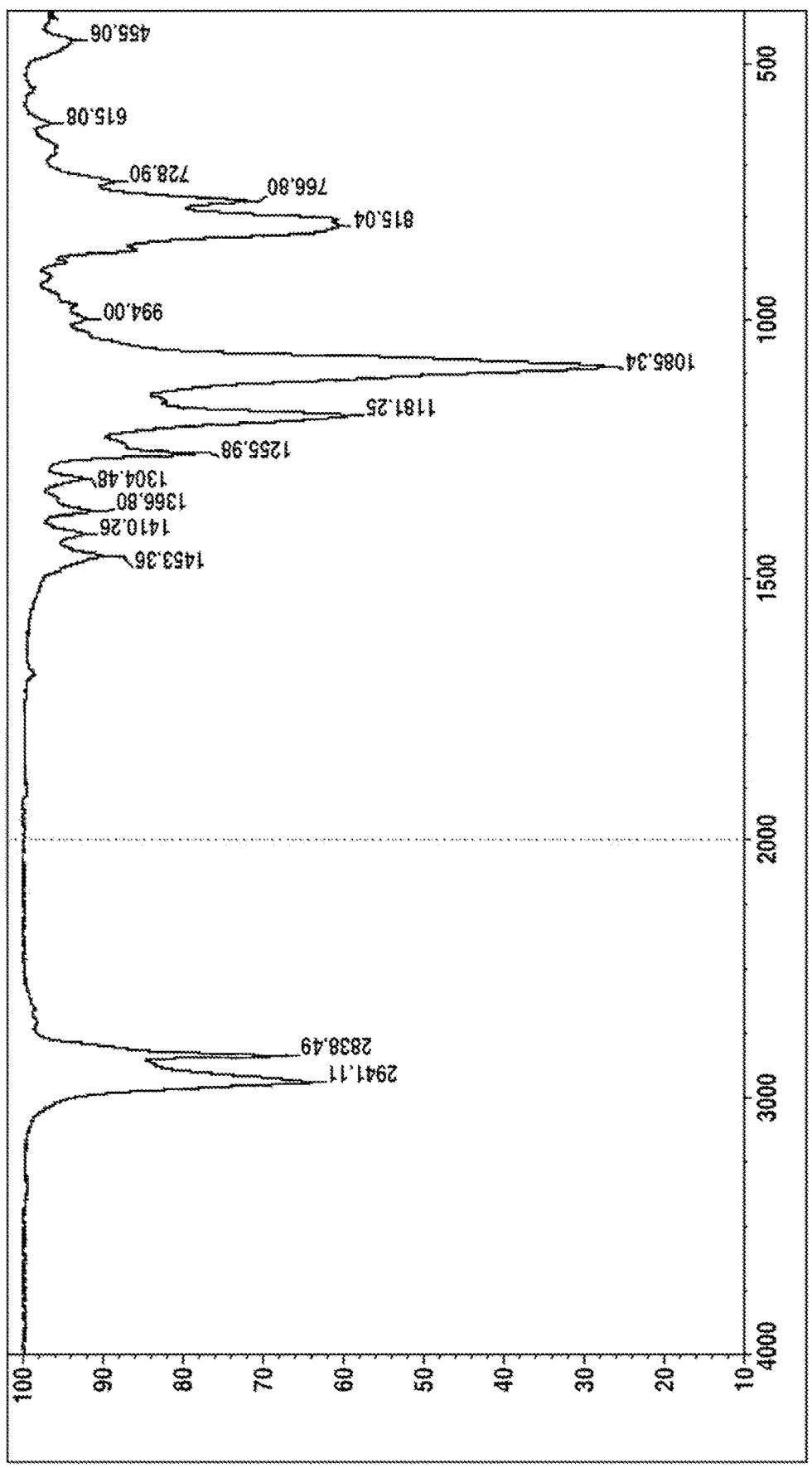
FIG. 5 is a diagram showing an IR spectrum of 2-methoxy-2-methyl-N-(trimethoxysilylpropylthioethyl)-1-aza-2-silacyclopentane obtained in Reference Example 1-3.
Figure 6:
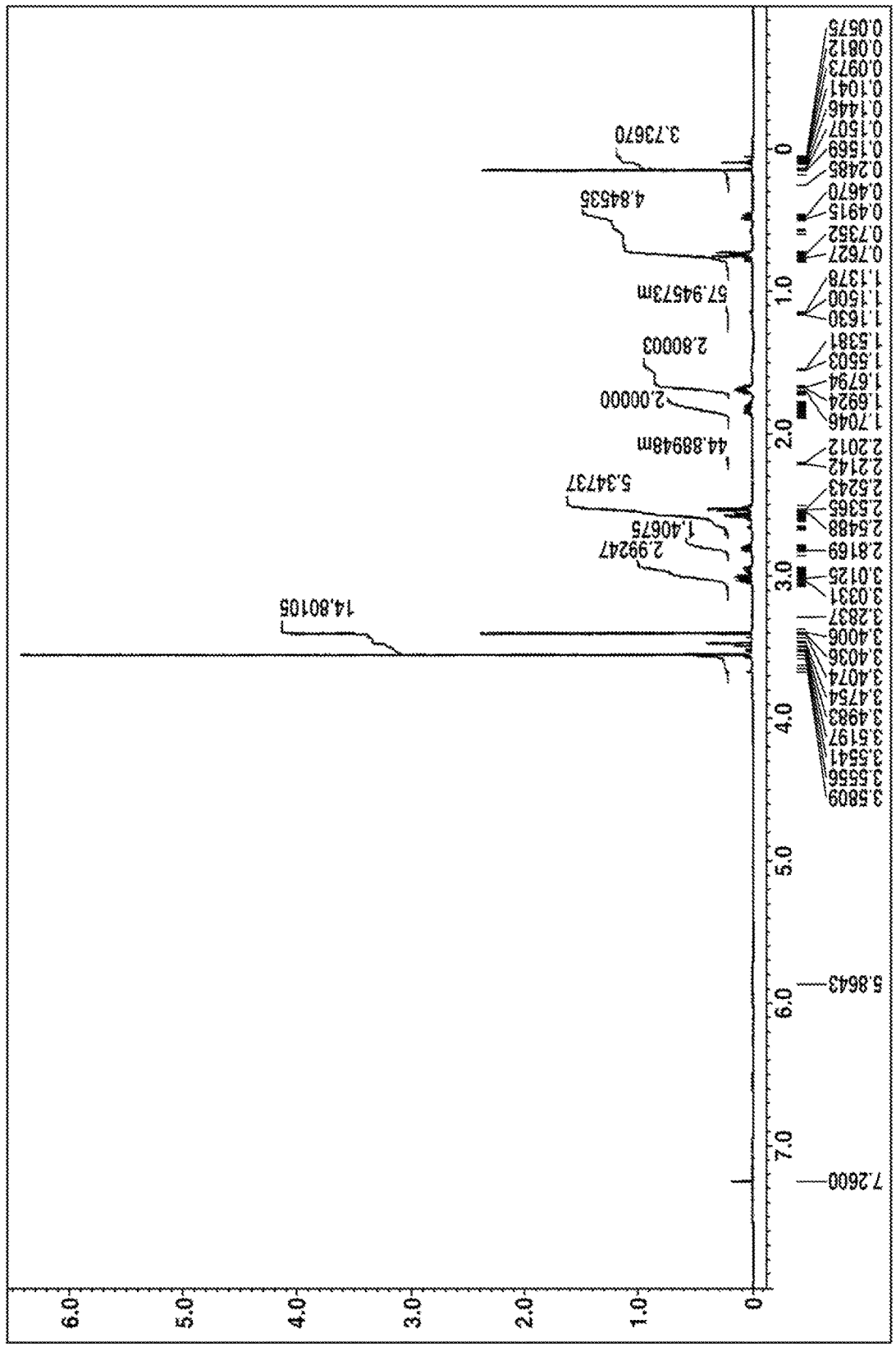
FIG. 6 is a diagram showing a $^1$H-NMR spectrum of 2-methoxy-2-methyl-N-(trimethoxysilylpropylthioethyl)-1-aza-2-silacyclopentane obtained in Reference Example 1-3.

The obtained reaction liquid was distilled to obtain 54 g of a fraction having a boiling point of 140 to 150° C./0.4 kPa (yield: 69%). IR and $^1$H-NMR analyses of the obtained fraction were performed. The results are shown in FIGS. 5 and 6.

Example 1-4

Synthesis of 2-ethoxy-2-methyl-N-(3-triethoxysilylpropylureidoethyl)-1-aza-2-silacyclopentane (Compound 4)

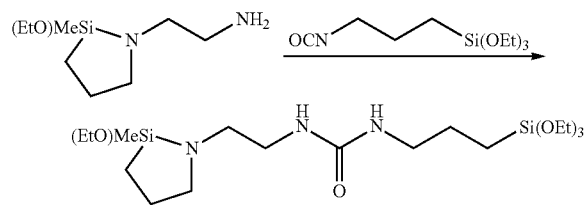

Figure 7:
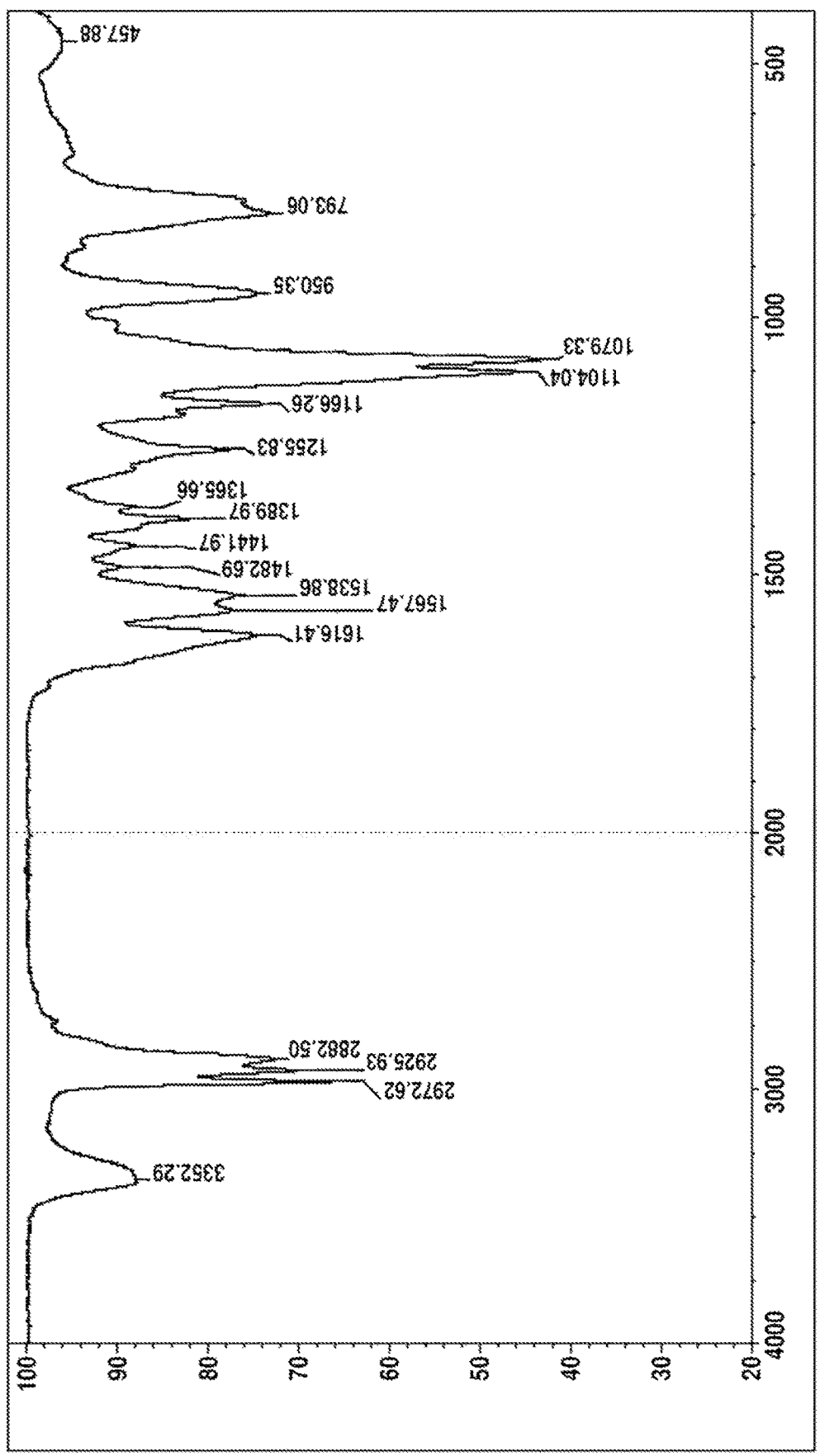
FIG. 7 is a diagram showing an IR spectrum of 2-ethoxy-2-methyl-N-(triethoxysilylpropylureidoethyl)-1-aza-2-silacyclopentane obtained in Example 1-4.
Figure 8:
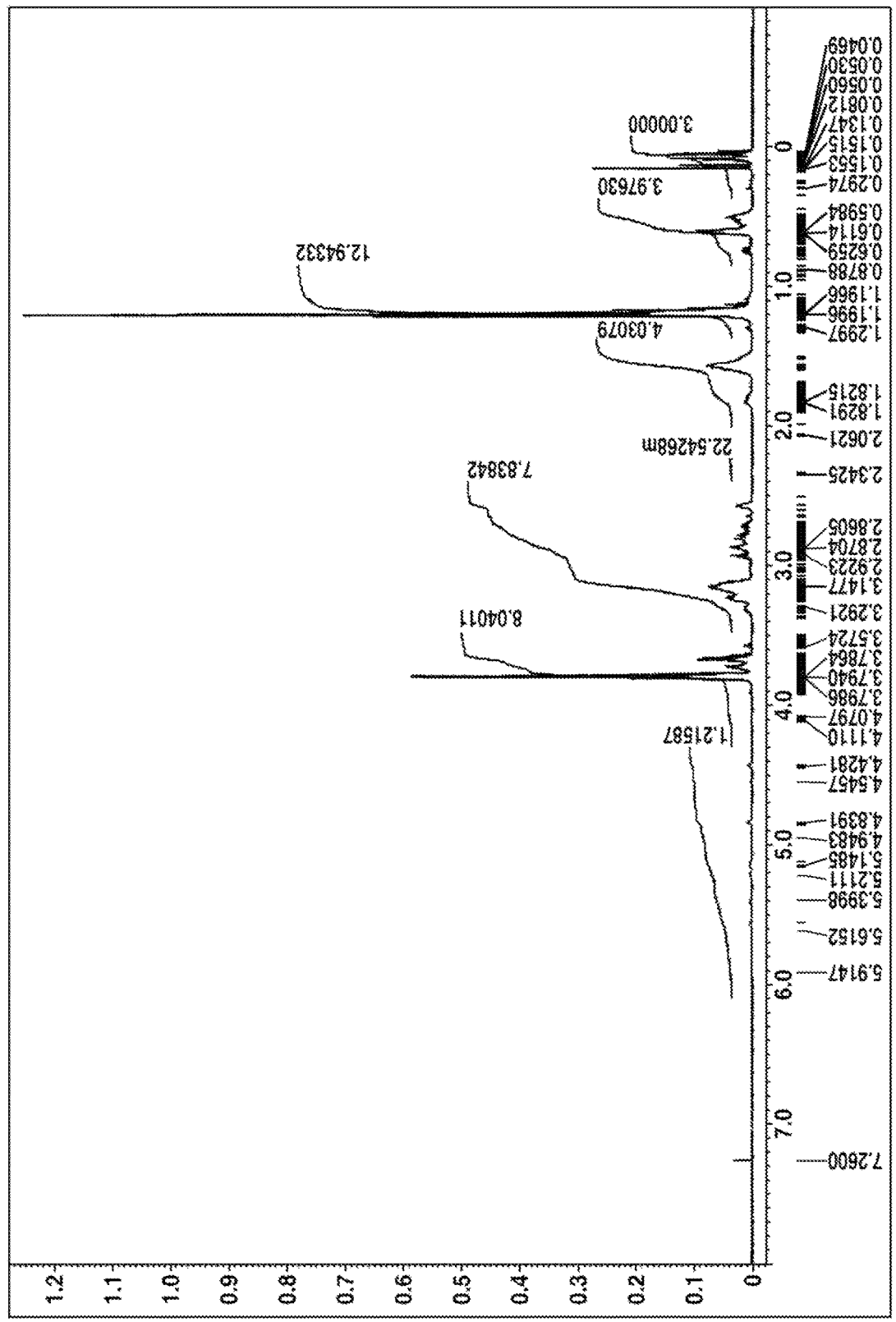
FIG. 8 is a diagram showing a $^1$H-NMR spectrum of 2-ethoxy-2-methyl-N-(triethoxysilylpropylureidoethyl)-1-aza-2-silacyclopentane obtained in Example 1-4.

The inside of a four-necked glass flask equipped with a stirrer, a thermometer and a reflux condenser was purged with nitrogen, and charged with 13.9 g (0.0738 mol) of 2-ethoxy-2-methyl-N-aminoethyl-1-aza-2-silacyclopentane. To this was added 18.0 g (0.0728 mol) of 3-isocyanatopropyltriethoxysilane, and the resulting mixture was stirred at room temperature for 30 minutes. 31 g of a reaction liquid was obtained. IR analysis of the reaction liquid was performed, and the results showed that a peak derived from an isocyanato group (2260 cm$^{-1}$) completely disappeared, and peaks derived from a ureido group (1616 and 3352 cm$^{-1}$) appeared. The results are shown in FIG. 7. The results of $^1$H-NMR measurement are shown in FIG. 8. From these results, generation of 2-ethoxy-2-methyl-N-(3-triethoxysilylpropylureidoethyl)-1-aza-2-silacyclopentane was confirmed.

Example 1-5

Synthesis of 2,2-dimethoxy-N-(3-trimethoxysilylpropoxycarbonyl(methyl)ethyl)-1-aza-2-silacyclopentane (Compound 5)

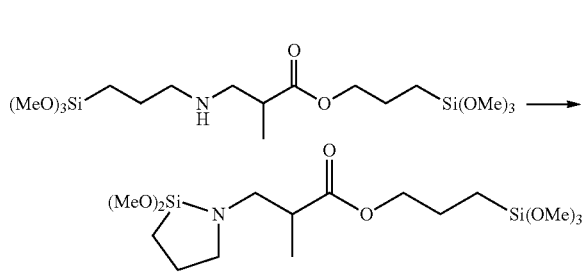

The inside of a four-necked glass flask equipped with a stirrer, a thermometer, a distillation tower and a reflux condenser was purged with nitrogen, 145.7 g (0.3407 mol) of (trimethoxysilylpropyl)-(trimethoxysilylpropoxycarbonyl(methyl)ethyl)amine, 160.2 g of toluene and 1.08 g (0.00719 mol) of trifluoromethanesulfonic acid were added, and the mixture was refluxed. To this mixture was added 68.8 g (0.384 mol) of N-trimethylsilyl-N-methylaniline, the mixture was stirred, and generated trimethylmethoxysilane was taken out together with toluene using a distillation column until the temperature reached a reaction temperature of 145° C.

Figure 9:
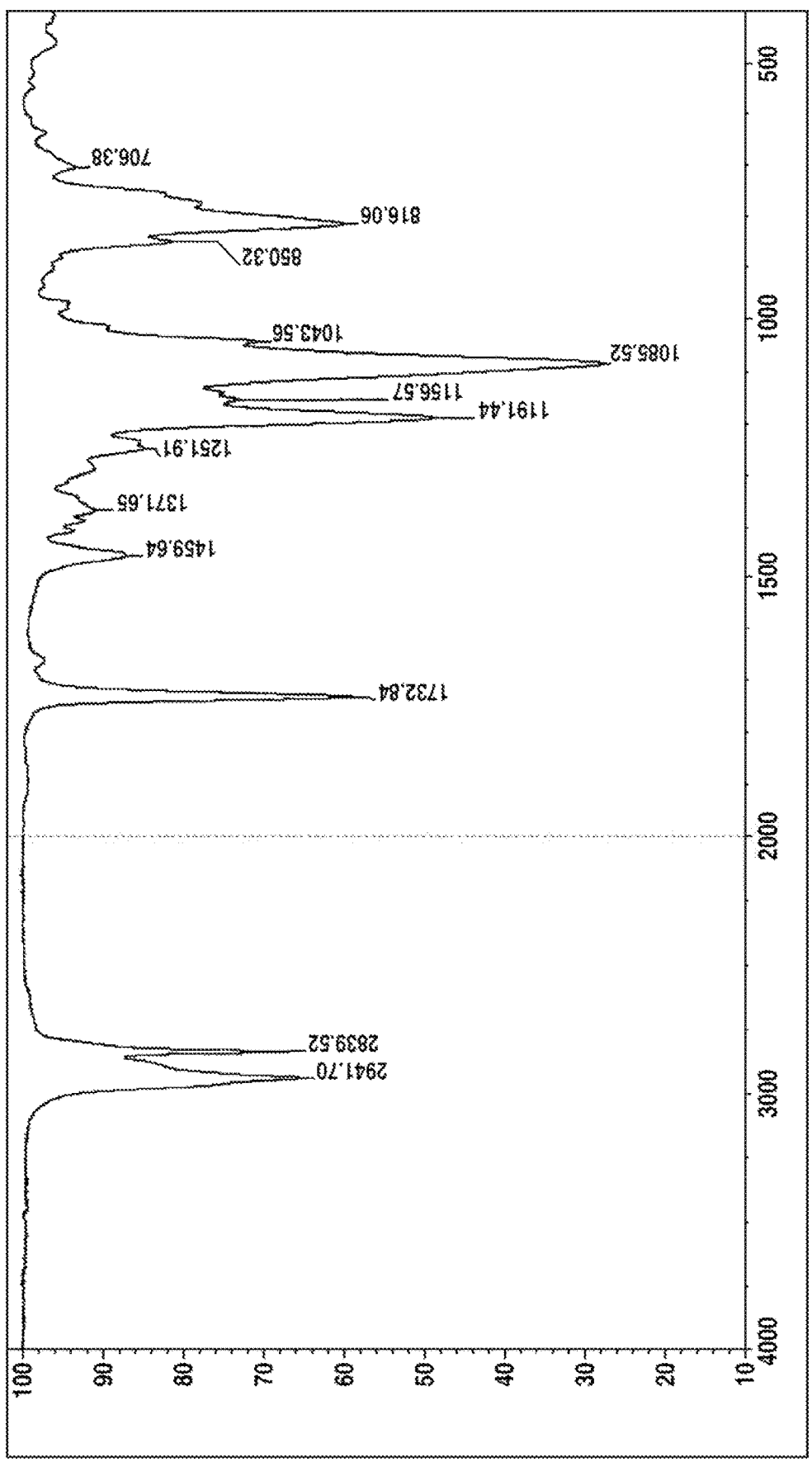
FIG. 9 is a diagram showing an IR spectrum of 2,2-dimethoxy-N-(3-trimethoxysilylpropoxycarbonyl)-1-aza-2-silacyclopentane obtained in Example 1-5.
Figure 10:
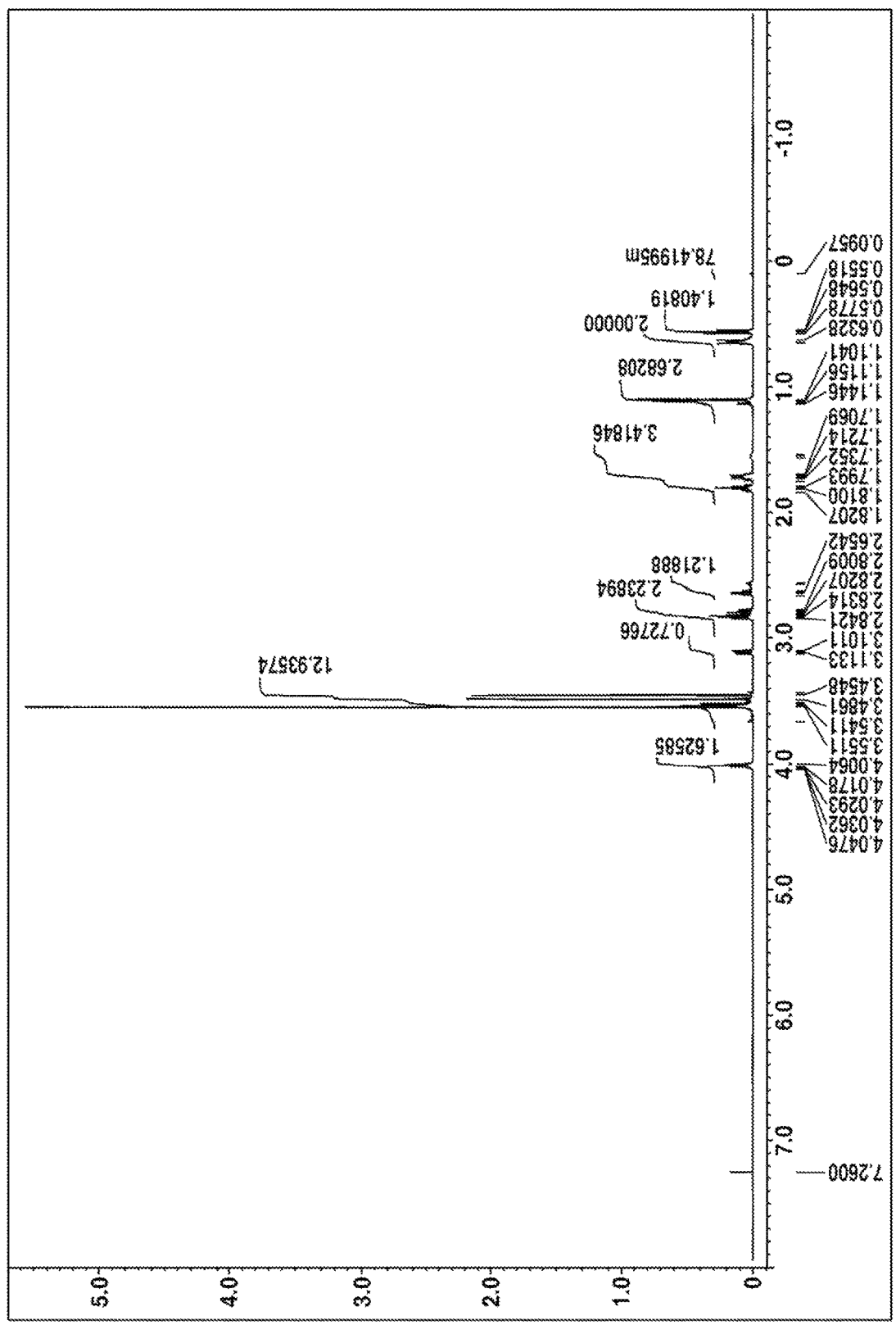
FIG. 10 is a diagram showing a $^1$H-NMR spectrum of 2,2-dimethoxy-N-(3-trimethoxysilylpropoxycarbonyl)-1-aza-2-silacyclopentane obtained in Example 1-5.

The obtained reaction liquid was distilled to obtain 29.6 g of a fraction having a boiling point 163° C./0.4 kPa (yield: 22%). IR and $^1$H-NMR analyses of the obtained fraction were performed. The results are shown in FIGS. 9 and 10.

Reference Example 1-6

Synthesis of 2,2-dimethoxy-N-(trimethoxysilyloctyl)-1-aza-2-silacyclopentane (Compound 1)

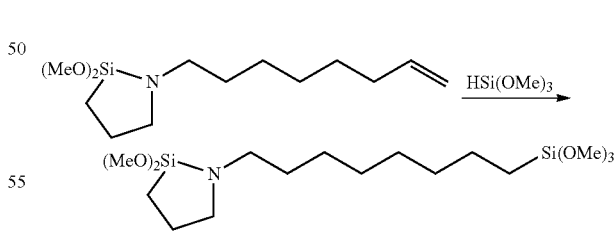

The inside of a four-necked glass flask equipped with a stirrer, a thermometer and a reflux condenser was purged with nitrogen, and charged with 19.0 g (0.0738 mol) of 2,2-dimethoxy-N-octenyl-1-aza-2-silacyclopentane and 0.0975 g of a toluene solution of platinum-1,3-divinyltetrasiloxane complex (0.000015 mol in terms of platinum), and the temperature was adjusted to 70° C. To this reaction liquid was added 8.1 g (0.066 mol) of trimethoxysilane, and the mixture was stirred at the same temperature for 4 hours. GC analysis of the reaction liquid revealed that 2,2-dimethoxy-N-(trimethoxysilyloctyl)-1-aza-2-silacyclopentane was generated.

Example 1-7

Synthesis of 2,2-dimethoxy-N-(trimethoxysilylpropylthiopropyl)-1-aza-2-silacyclopentane (Compound 6)

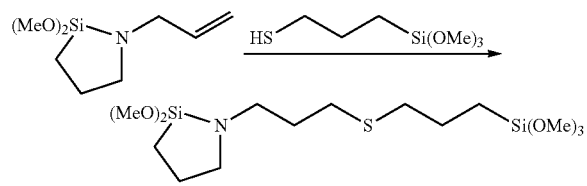

The inside of a four-necked glass flask equipped with a stirrer, a thermometer and a reflux condenser was purged with nitrogen, and charged with 12.8 g (0.0650 mol) of 3-mercaptopropyltrimethoxysilane, and the temperature was adjusted to 90° C. To this was added dropwise a mixture of 10.1 g (0.0539 mol) of 2,2-dimethoxy-N-allyl-1-aza-2-silacyclopentane, 0.21 g (0.0011 mol) of 2,2-azobisisobutyronitrile and 5 g of toluene over 3 hours, and the mixture was stirred at the same temperature for 4 hours. GC analysis of the reaction liquid revealed that 2,2-dimethoxy-N-(trimethoxysilylpropylthiopropyl)-1-aza-2-silacyclopentane was generated.

Examples 2-1 to 2-4 and Comparative Example 2

The compounds used in Examples 2-1 to 2-4 and Comparative Example 2 are shown below.
(1) Cyclic Silazane Compound
Cyclic Silazane Compounds 1 to 4 Synthesized in Examples 1-1 to 1-4 (Referred to as Compounds 1 to 4)
2,2-dimethoxy-N-trimethoxysilylpropyl-1-aza-2-silacyclopentane of the following formula (referred to as comparative compound)

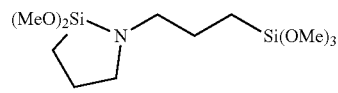

(2) Hydrolyzable Silicone Compound 1,3 dimethoxy-1,1,3,3-tetramethyldisiloxane

KR-400: a composition containing a hydrolyzable silicone compound having a methyl group and a methoxy group and a curing catalyst (manufactured by Shin-Etsu Chemical Co., Ltd.)

KR-401N: a hydrolyzable silicone compound having a methyl group, a phenyl group and a methoxy group (manufactured by Shin-Etsu Chemical Co., Ltd.)

KC-89S: a hydrolyzable silicone compound having a methyl group and a methoxy group (manufactured by Shin-Etsu Chemical Co., Ltd.)

(3) Solvent
Dipropylene Glycol Dimethyl Ether (Manufactured by Tokyo Chemical Industry Co., Ltd.)
(4) Curing Catalyst
D-25: Titanium compound (manufactured by Shin-Etsu Chemical Co., Ltd.)

A curable composition was prepared by blending each of the compounds 1 to 4 obtained in Examples 1-1 to 1-4 and the comparative compound with a solvent at a ratio as shown in Table 1 below.

Each curable composition was applied onto an aluminum plate (7 cm×15 cm with a bar coater to a wet thickness of 30 μm, and then left standing in an environment at 25° C. and 50% relative humidity to prepare a test piece provided with a cured film. The crack resistance of the obtained test piece was evaluated by the following method. The results are shown in Table 1.

[Crack Resistance]

The test piece covered with a cured film was left standing at room temperature for 1 day, and whether or not cracking or peeling occurred in the film was checked. The time until occurrence of the cracking or peeling was measured.

In addition, the test piece after curing was heated in an environment at 150° C. for 2 hours, and whether cracking or peeling occurred in the coating film was checked every 5 minutes. The time until occurrence of the cracking or peeling was measured. When there was no change, the test piece was rated "◯". The results are shown in Table 1.

TABLE 1

| | | Example | | | | Comparative Example |
|---|---|---|---|---|---|---|
| | | 2-1 | 2-2 | 2-3 | 2-4 | 2 |
| Cyclic silazane compound | Compound 1 | 100 | | | | |
| | Compound 2 | | 100 | | | |
| | Compound 3 | | | 100 | | |
| | Compound 4 | | | | 50 | |
| | Comparative compound | | | | | 100 |
| Solvent | Dipropylene glycol dimethyl ether | | | | 50 | |
| Time until cracking or peeling | Room temperature | ◯ | ◯ | ◯ | ◯ | 30 min |
| | 150° C. | ◯ | ◯ | ◯ | ◯ | <5 min |

As shown in Table 1, it is apparent that the cured products of the cyclic silazane compound having an alkoxysilyl group according to the present invention suffer less cracking and peeling caused by shrinkage on curing on the aluminum plate than a cured product obtained from a conventional cyclic silazane compound having an alkoxysilyl group.

Examples 3-1 to 3-8, Comparative Examples 3-1 to 3-2

A curable composition was prepared by blending each of the compounds 1 to 4 obtained in Examples 1-1 to 1-4 and the comparative compound with the following hydrolyzable silicone compound at a ratio as shown in Table 2 below.

The obtained composition was applied onto a SUS 430 plate (7 cm×15 cm) with a bar coater to a wet thickness of 30 μm, and then cured in an environment at 25° C. and 50% relative humidity to prepare a cured film.

Subsequently, the test piece after curing was heated in an environment at 150° C., for 2 hours, and whether cracking or peeling occurred in the coating film was checked every 5 minutes. The time until occurrence of the cracking or peeling was measured. When there was no change, the test piece was rated "○". The results are shown in Table 2.

TABLE 2

| | | Example | | | | | | | | Comparative Example | |
|---|---|---|---|---|---|---|---|---|---|---|---|
| | | 3-1 | 3-2 | 3-3 | 3-4 | 3-5 | 3-6 | 3-7 | 3-8 | 3-1 | 3-2 |
| Cyclic silazane compound | Compound 1 | 70 | 50 | | | | | | | | |
| | Compound 2 | | | 70 | 50 | | | | | | |
| | Compound 3 | | | | | 35 | 25 | | | | |
| | Compound 4 | | | | | | | 35 | 25 | | |
| | Comparative compound | | | | | | | | | 70 | 50 |
| Hydrolyzable silicone compound | 1,3-dimethoxy-tetramethyldisiloxane | 30 | 50 | | | | | | | 30 | 50 |
| | KR-400 | | | 30 | 50 | 15 | 25 | 15 | 25 | | |
| Solvent | Dipropylene glycol dimethyl ether | | | | | | | 50 | 50 | | |
| Time until cracking or peeling | | ○ | ○ | ○ | ○ | ○ | ○ | ○ | ○ | <5 min | <5 min |

As shown in Table 2, it is apparent that the cured products of the cyclic silazane compound having an alkoxysilyl group according to the present invention suffer less cracking and peeling caused by shrinkage on curing on the SUS plate than a cured product obtained from a conventional cyclic silazane compound having an alkoxysilyl group.

Examples 4-1 to 4-5, Comparative Examples 4-1 to 4-2

A curable composition was prepared by blending each of the compounds 1 to 5 obtained in Examples 1-1 to 1-5 and the comparative compound with the hydrolyzable silicone compound and the curing catalyst at a ratio as shown in Table 3 below.

The obtained composition was applied onto a polycarbonate plate (7 cm×15 cm, manufactured by AS ONE CORPORATION.) with a bar coater to a wet thickness of 30 μm, and then cured in an environment at 25° C. and 50% relative humidity to prepare a cured film.

Subsequently, the test piece was left standing in an environment at 25° C. and 50% relative humidity to prepare a cured film. After confirmation of curing, the cured film was further left standing at room temperature for 2 days to prepare a test piece.

A cross-cut test (conforming to JIS K 5600) was conducted on the obtained test piece, and the surface state was evaluated on a scale of 0 to 5. The smaller the number, the better the adhesion. The results are shown in Table 3.

TABLE 3

| | | Example | | | | | Comparative Example | |
|---|---|---|---|---|---|---|---|---|
| | | 4-1 | 4-2 | 4-3 | 4-4 | 4-5 | 4-1 | 4-2 |
| Cyclic silazane compound | Compound 1 | 70 | | | | | | |
| | Compound 2 | | 70 | | | | | |
| | Compound 3 | | | 35 | | | | |
| | Compound 4 | | | | 70 | | | |
| | Compound 5 | | | | | 35 | | |
| | Comparative compound | | | | | | | 70 |

TABLE 3-continued

|  |  | Example | | | | | Comparative Example | |
|---|---|---|---|---|---|---|---|---|
|  |  | 4-1 | 4-2 | 4-3 | 4-4 | 4-5 | 4-1 | 4-2 |
| Hydrolyzable silicone compound | KR-400 | 30 | 30 |  |  | 15 | 100 | 30 |
|  | KR-401N |  |  | 15 |  |  |  |  |
|  | KC-89S |  |  |  | 30 |  |  |  |
| Curing catalyst | D-25 |  |  | 2.5 | 5 |  |  |  |
| Solvent | Dipropylene glycol dimethyl ether |  |  | 50 |  | 50 |  |  |
| Adhesion |  | 0 | 0 | 1 | 0 | 1 | 5 | 5 |

As shown in Table 3, it is apparent that the cured products of curable compositions containing an alkoxysilyl group-containing cyclic silazane compound according to the present invention have excellent adhesion even on a polycarbonate plate on which cured products containing a conventional alkoxysilyl group-containing cyclic silazane compound or hydrolyzable silicone compound have poor adhesion.

Japanese Patent Application No. 2021-158811 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A cyclic silazane compound having an alkoxysilyl group, represented by the following general formula (1):

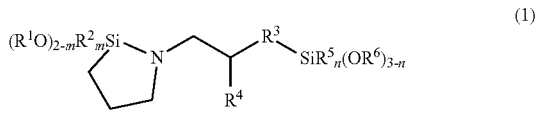

(1)

wherein $R^1$, $R^2$, $R^5$ and $R^6$ each independently represent an unsubstituted monovalent hydrocarbon group having 1 to 10 carbon atoms, $R^3$ represents a divalent hydrocarbon group having 6 to 10 carbon atoms or a divalent hydrocarbon group having 4 to 20 carbon atoms, which contains a sulfur atom, an ester bond or a urea bond, $R^4$ represents a hydrogen atom or an unsubstituted monovalent hydrocarbon group having 1 to 10 carbon atoms, m is 0 or 1, and n is 0, 1 or 2.

2. A method for producing the cyclic silazane compound having an alkoxysilyl group according to claim 1, the method comprising intramolecularly dealcoholizing and cyclizing a bis(alkoxysilylalkyl)aminosilane compound of the following general formula (2):

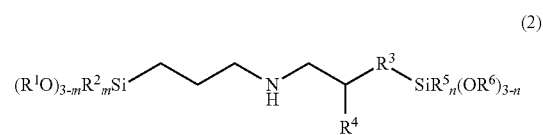

(2)

wherein $R^1$ to $R^6$, m and n represent the same meaning as described above.

3. A method for producing the cyclic silazane compound having an alkoxysilyl group according to claim 1, the method comprising reacting a cyclic silazane compound of the following general formula (3):

(3)

wherein $R^1$, $R^2$ and m represent the same meaning as described above, and $R^7$ represents a monovalent hydrocarbon group having 2 to 18 carbon atoms and having an unsaturated bond at the terminal thereof or a monovalent hydrocarbon group having 1 to 18 carbon atoms and an amino group at the terminal thereof, with an alkoxysilane compound of the following general formula (4):

$$A\text{-}SiR^5{}_n(OR^6)_{3-n} \quad (4)$$

wherein $R^5$, $R^6$ and n represent the same meaning as described above, and A represents a mercaptoalkyl group having 1 to 8 carbon atoms, or an isocyanatoalkyl group having 1 to 8 carbon atoms.

4. A curable composition comprising the cyclic silazane compound according to claim 1.

5. A cured product of the curable composition according to claim 4.

6. A covered substrate comprising a substrate, and a film formed on the substrate,
the film being formed from the curable composition according to claim 4.

* * * * *